United States Patent
Campbell et al.

(10) Patent No.: US 9,940,298 B2
(45) Date of Patent: Apr. 10, 2018

(54) SIGNAL CONDITIONER DISCOVERY AND CONTROL IN A MULTI-SEGMENT DATA PATH

(71) Applicant: Texas Instruments Incorporated, Dallas, TX (US)

(72) Inventors: Charles Michael Campbell, Wylie, TX (US); Richard Edwin Hubbard, Allen, TX (US); Sreeraman Anantharaman, Cupertino, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 258 days.

(21) Appl. No.: 14/659,582

(22) Filed: Mar. 16, 2015

(65) Prior Publication Data

US 2015/0261718 A1 Sep. 17, 2015

Related U.S. Application Data

(60) Provisional application No. 61/954,252, filed on Mar. 17, 2014, provisional application No. 61/954,498, filed on Mar. 17, 2014.

(51) Int. Cl.
*G06F 13/42* (2006.01)
*G06F 13/40* (2006.01)

(52) U.S. Cl.
CPC ...... *G06F 13/4286* (2013.01); *G06F 13/4081* (2013.01); *Y02B 60/1228* (2013.01); *Y02B 60/1235* (2013.01)

(58) Field of Classification Search
CPC . G09G 2370/10; H04B 17/0085; H04B 17/21
See application file for complete search history.

(56) References Cited

U.S. PATENT DOCUMENTS

| | | | | |
|---|---|---|---|---|
| 5,142,531 A | * | 8/1992 | Kirby | H04L 45/00 370/254 |
| 7,853,731 B1 | * | 12/2010 | Zeng | G09G 5/006 710/17 |
| 2012/0079162 A1 | * | 3/2012 | Jaramillo | G09G 5/006 710/316 |

OTHER PUBLICATIONS

"DisplayPort" Wikipedia, pp. 1-19, available at http://en.wikipedia.org/w/index.php?title=DisplayPort&oldid=647133631 on Feb. 14, 2015.
"DisplayPort Standard" VESA DisplayPort Standard, Version 1.1, Mar. 19, 2007, pp. 1-228.

* cited by examiner

*Primary Examiner* — Tim T Vo
*Assistant Examiner* — Herve Iradukunda
(74) *Attorney, Agent, or Firm* — Gregory J. Albin; Charles A. Brill; Frank D. Cimino

(57) ABSTRACT

In a segmented data path, a source is able to "discover" whether any tunable repeater nodes are present. When one or more tunable repeaters are discovered, the source may adjust its link initialization sequence accordingly to train each "hop" individually and thereafter individually configure each intermediary repeater.

20 Claims, 30 Drawing Sheets

AUX READ THAT ONLY TARGET RETIMER

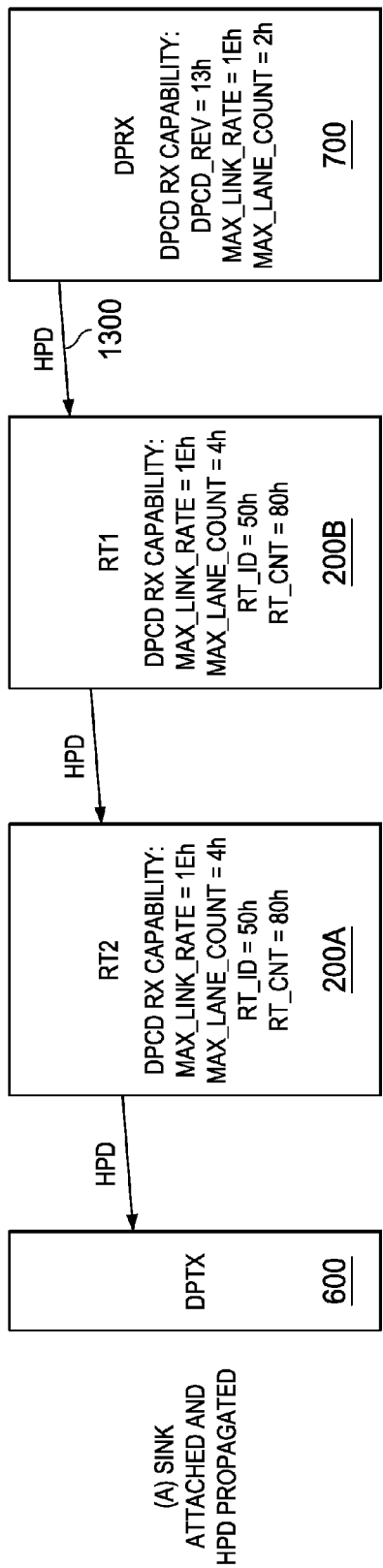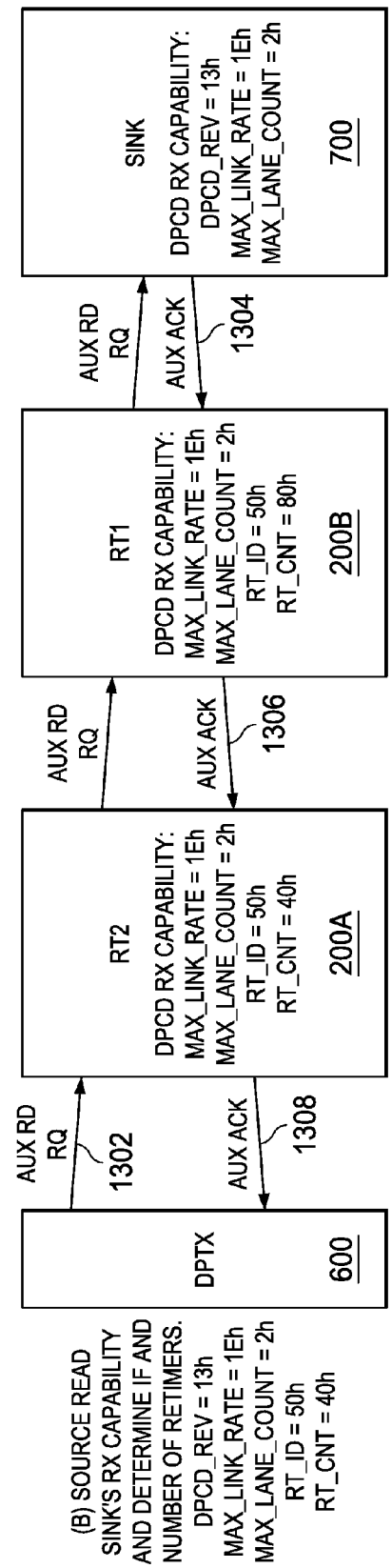
FIG. 13A
FIG. 13B

SIGNAL CONDITIONER DISCOVERY AND CONTROL IN A MULTI-SEGMENT DATA PATH

CLAIM OF PRIORITY UNDER 35 U.S.C. 119(e)

The present application claims priority to and incorporates by reference U.S. Provisional Application No. 61/954,252, filed Mar. 17, 2014, entitled "Signal Conditioner Discovery and Control in a Display Port Ecosystem." The present application also claims priority to and incorporates by reference U.S. Provisional Application No. 61/954,498, filed Mar. 17, 2014, entitled Methods and Apparatus for Signal Conditioning of High Speed Bus Signal."

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE DISCLOSURE

The disclosure relates generally to the field of audio/visual (A/V) consumer electronics devices, as well as networks thereof. More particularly, in one exemplary aspect, the disclosure is directed to methods and apparatus for configuring a signal conditioning device.

BACKGROUND OF THE DISCLOSURE

DisplayPort® is an exemplary and emerging digital display interface technology specified by the Video Electronics Standards Association (VESA). Current incarnations of the standard specify support for simple networking of digital audio/visual (AIV) interconnects intended to be used primarily between an arbitrary assembly of multimedia "sources" (e.g., computers or CPUs) and "sinks" (e.g., display monitors, home-theater system, etc.). This interconnection is generally unidirectional in nature, i.e., from source to sink, in current implementations.

DisplayPort operation is inherently limited according to certain physical limitations of the DisplayPort cable. Specifically, as DisplayPort signaling traverses a length of cable, the signal experiences attenuation and distortion. Beyond a certain length, the signal is irrecoverable. These undesired effects are more severe at higher signaling speeds. Recent upgrades to DisplayPort have added higher data rates, e.g., adding 2.7 Gbits/s, 5.4 Gbits/s, and 8.1 Gbits/s to existing implementations of 1.62 Gbits/s.

Signal conditioning devices may be used for improving DisplayPort operation. An example of a signal conditioning device is a so-called "retimer". Existing DisplayPort retimers are simple clock data recovery (CDR) circuits that extend the cabling of a DisplayPort cable by recovering the original clock and data, and regenerating a "clean" version of the signal.

BRIEF DESCRIPTION OF THE DRAWINGS

Particular embodiments in accordance with the disclosure will now be described, by way of example only, and with reference to the accompanying drawings:

FIGS. 13A-B are logical ladder diagrams of an exemplary DisplayPort discovery operation;

Figure 1:
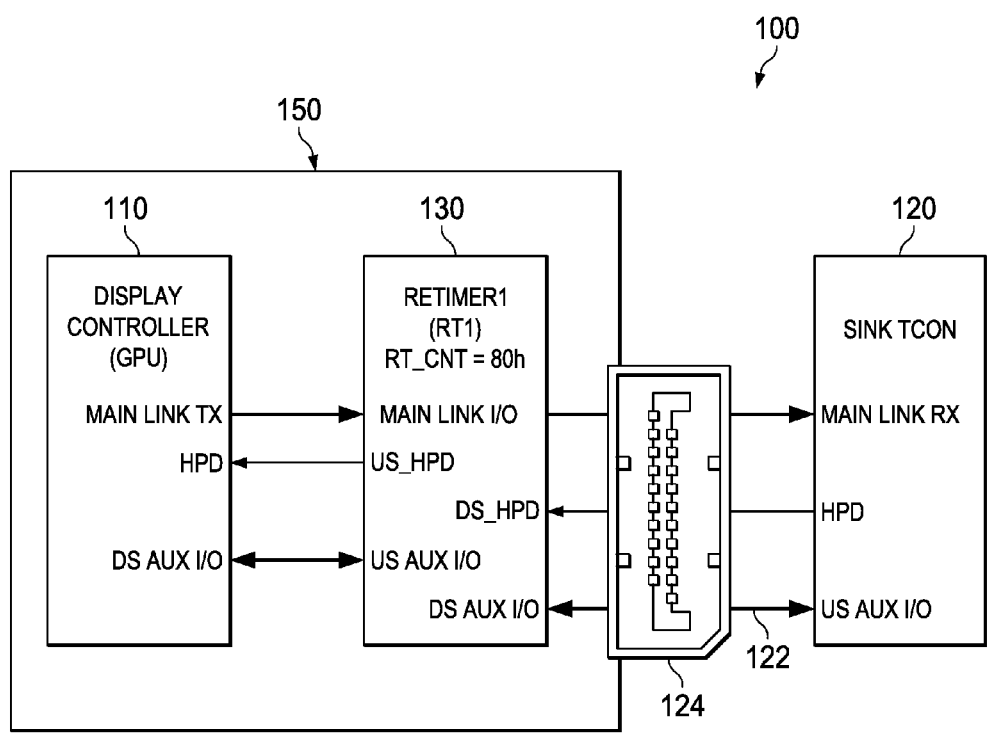
FIG. 1 is an illustration of an exemplary DisplayPort system.

Other features of the present embodiments will be apparent from the accompanying drawings and from the detailed description that follows.

DETAILED DESCRIPTION OF EMBODIMENTS OF THE DISCLOSURE

Specific embodiments of the disclosure will now be described in detail with reference to the accompanying figures. Like elements in the various figures are denoted by like reference numerals for consistency. In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

As used herein, the term "DisplayPort" refers without limitation to apparatus and technology compliant with "VESA DisplayPort Standard"—Version 1.3, released September/2014, and to prior versions. VESA DisplayPort Standard—Version 1.1 is incorporated by reference herein.

Overview

DisplayPort provides unidirectional transmission of audio and video data from source nodes where the content is generated to sink nodes that consume content via one (1), two (2), or four (4) main link lanes. An auxiliary channel (AUX) provides for capability and status information to be sent from the sink to the source. While existing DisplayPort main link functionality is based on a unidirectional transport, the various principles described herein apply to bi-directional transports as well (as well as any future bi-directional DisplayPort transport schemes). Moreover, those of ordinary skill in the related arts will appreciate that bi-directional transport technologies may operate according to a full duplex (i.e., simultaneous upstream and downstream traffic) or half-duplex scheme (i.e., time multiplexed upstream and downstream traffic) modes. The primary and auxiliary channels (AUX) operate in "master/slave" mode under control of the master node. The master node controls both the low-level transmission of data between source and sink, and the higher level management of the display and networking.

A DisplayPort data path may include multiple segments that may be separated by one or more signal conditioning modules that may be provided to receive and retransmit signals in order to extend the length of the data path between a source and a sink. These signal conditioning modules are typically referred to as "repeaters". The DisplayPort Standard provides for two types of repeaters: (1) a redriver that receives a signal and redrives it with optional equalization and voltage swing and pre-emphasis adjustments; and (2) a retimer that utilizes clock and data recovery (CDR) for retiming and then optionally provides voltage swing and pre-emphasis adjustment. The following descriptions will describe retimers in more detail; however, embodiments of the disclosure may apply to simple redrivers in a similar manner.

Previously, DisplayPort repeater devices have been "transparent" to the DisplayPort source and DisplayPort sink nodes. In other words, a source node is unaware of the retimers between it and a sink node. During normal operation, the DisplayPort retimers "sniff" the control information (on the AUX channel) that is being exchanged between the DisplayPort source and sink node, and may adjust their operation accordingly, if necessary. During link initialization, the DisplayPort source configures the link based on the feedback it receives from the DisplayPort sink. This presents two distinct issues if one or more DisplayPort retimers are present: (1) the DisplayPort source may not be receiving the training signaling from the DisplayPort sink and thus the feedback it receives may be inaccurate, and (2) the resulting configuration of the DisplayPort source and the intermediary DisplayPort retimers may be incorrect.

Methods and apparatus for configuring a signal conditioning device, such as a retimer, are disclosed herein. In an exemplary embodiment, a DisplayPort source and/or sink are able to "discover" whether any DisplayPort retimers are present. When one or more DisplayPort retimers are discovered, the DisplayPort source may adjust its link initialization sequence accordingly in order to train each data path segment distinctly by individually configuring each intermediary DisplayPort retimer. As such, embodiments of the present disclosure may be referred to herein as "link training (LT)-tunable repeaters". The scheme that is disclosed herein seamlessly operates with legacy devices and procedures.

More generally, the various principles described herein broadly relate to implementing link training and configuration functionalities for signal conditioning solutions within existing legacy frameworks. By enabling "visibility" for signal conditioning devices, the signal conditioning devices may be configured and adjusted during operation. Artisans of ordinary skill, given the contents of the present disclosure, will readily appreciate the applicability of the principles described herein to other technologies, such as, for example, Universal Serial Bus (USB), FireWire, and High Definition Multimedia Interface (HDMI).

Exemplary embodiments of the present disclosure are described in detail below. While these embodiments are primarily discussed in the context of modifications to DisplayPort to support configuration of a signal conditioning device, it will be recognized by those of ordinary skill in the art that the present disclosure is not so limited. In fact, the various aspects of the disclosure are useful in any network technology that is configured to incorporate intermediary devices, such as, for example, signal conditioning, hubs, and repeaters.

While the following embodiments describe specific implementations of dedicated address spaces, legacy support capabilities, and specific protocols, etc., those of ordinary skill in the related arts will readily appreciate that such descriptions are purely illustrative.

Exemplary DisplayPort Retimer

Existing DisplayPort technology is an extensible digital interface solution that is designed for a wide variety of performance requirements, and broadly supports devices including PCs (personal computers), monitors, panels, projectors, mobile phones, tablets, and high definition (HD) content applications, for example. DisplayPort technology is capable of supporting both internal chip-to-chip, and external "box-to-box" digital display connections. Examples of internal chip-to-chip applications include notebook PCs which drive a display panel from a graphics controller, or display components from display controllers driving the monitor of a TV. Examples of box-to-box applications include display connections between PCs or tablets (for example) and monitors or projectors (for example) that are not housed within the same physical device.

FIG. 1 is an illustration of an exemplary DisplayPort system 100 that includes a source module 110, a sink module 120, and an LT-tunable retimer module 130. In this example, source module 110 and retimer module 130 are located in a common enclosure 150, while cable 122 is used to couple to sink 120 via a connector 124. In another embodiment, retimer 130 may be co-located with sink 120 in a common enclosure, for example. In this embodiment, the Auxiliary Channel (AUX), a hot plug detect signal (HPD), and the DisplayPort main link lanes are routed through retimer 130. In the figures, "US" refers to upstream, "DS" refers to downstream, "HPD" refers to hot plug detect, "RT" refers to retimer, "GPU" refers to graphic processor unit, and "TCON" refers to timing controller.

Figure 2:
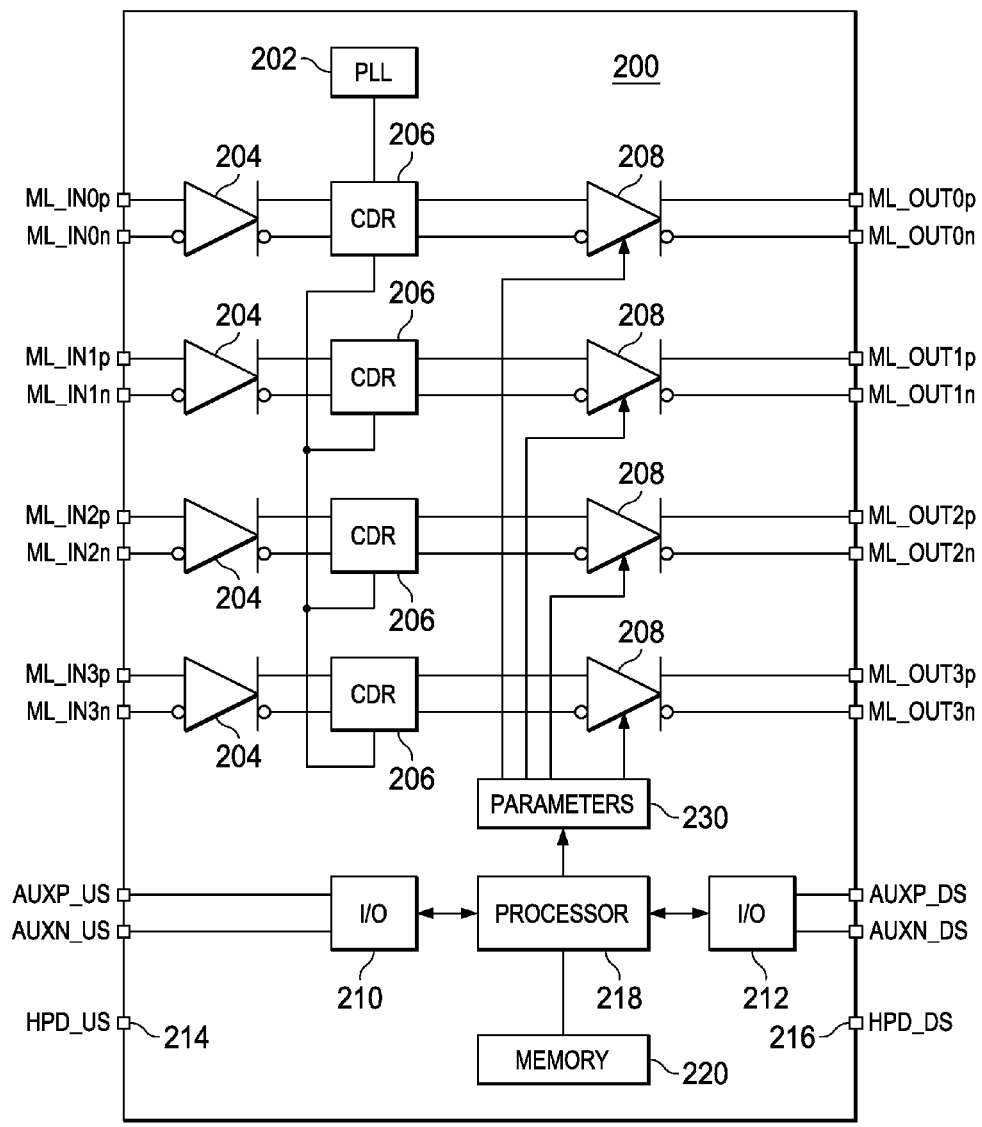
FIG. 2 is a logical block diagram of one exemplary embodiment of a DisplayPort retimer device.

FIG. 2 is a block diagram of one exemplary embodiment of a DisplayPort retimer device 200 that may be used in FIG. 1 as retimer 130. As shown, the retimer includes a phase locked loop (PLL) 202, four (4) main link inputs 204 which each connect to a corresponding clock data recovery (CDR) circuit 206. Each CDR circuit is connected to a corresponding output differential driver 208. Also shown is an AUX upstream port 210, and an AUX downstream port 212, and a hot plug detect (HPD) upstream 214 and downstream port 216. Finally, the exemplary DisplayPort retimer device 200 includes a data path processor 218 and associated memory 220.

While four (4) main link lanes are shown, it is appreciated that the number of lanes is purely implementation dependent; some variants may operate with fewer lanes, and similarly, other implementations may use a greater number of lanes. For example, the VESA internal DisplayPort (iDP) Standard (April/2010) allows up to sixteen lanes. Traditionally, the DisplayPort AUX channel is configured to set up link operation, and incorporates procedures for topology discovery, bandwidth allocation, etc. In some simplified embodiments, the AUX channel may be replaced with an alternative bus technology. For example, in some implementations, an Inter-IC bus (I2C) type interface may be used for link control. Similarly, HPD functionality is shown, but may not be present in every implementation.

The data path processor 218 includes circuitry that is configured to execute one or more instructions stored within the memory subsystem 220. As used herein, the term "circuitry" refers without limitation to any type of component or device having any level of integration (including without limitation ULSI, VLSI, and LSI) and irrespective of process or base materials (including, without limitation Si, SiGe, CMOS and GaAs), as well as discrete components such as resistors, diodes, capacitors, inductive reactors, and any combinations of the foregoing. As used herein, the term "memory" includes any type of integrated circuit or other storage device adapted for storing digital data within a non-transitory computer readable medium. Common examples of memory include, without limitation, ROM, PROM, EEPROM, DRAM, SDRAM, DDR/2 SDRAM, EDO/FPMS, RLDRAM, SRAM, "flash" memory (e.g., NAND/NOR), and PSRAM, for example.

During normal operation, DisplayPort symbols (which use 8B10B encoding, or a variant thereof) may be received by differential receivers 204. CDR circuitry 206 is operable to recover a clock and the originally transmitted data symbols using known CDR techniques. PLL 202 is configured to generate a clock output that has a phase that is related to the phase of the recovered clock. The resulting recovered data signals are regenerated at the output differential drivers 208. Since the output data signals are regenerated in the digital domain (and not merely amplified analog signals), noise received at the retimer input is not passed through to the retimer output. Drivers 208 are also referred to herein as transmitters. A storage circuit 230 may be provided to store parameters that control the operation of the output transmitters 230, such as differential voltage swing and frequency band pre-emphasis, for example.

As previously alluded to, DisplayPort systems undergo a relatively sophisticated link initialization training process. During a typical link initialization, a DisplayPort source determines the capabilities of a DisplayPort sink (e.g., supported functionality, speeds, etc.), and performs an iterative training sequence. During each iteration, the DisplayPort source transmits a training sequence with a selected set of transmit parameters and the DisplayPort sink responsively reports its recovered link quality. This iterative process allows the DisplayPort source to identify the optimal transmit parameters to maximize efficiency, power consumption, and performance. Common examples of transmit parameters may include for example, drive strength (milli-Amperes (mA)), amplitude (peak-to-peak voltage (Vodpp)), lane alignment, and timing.

Unlike prior DisplayPort retimer devices that are "transparent" to the DisplayPort source and DisplayPort sink nodes (i.e., a source node is unaware of the retimers between it and a sink node, an exemplary LT-tunable DisplayPort retimer is configured to indicate its presence during link initialization. Specifically, an appropriately enabled DisplayPort master node can read and write to memory space which is dedicated for DisplayPort retimers, and restricted for other DisplayPort devices. In this manner, the DisplayPort master node can appropriately configure the DisplayPort retimer for optimal operation.

Figure 3:
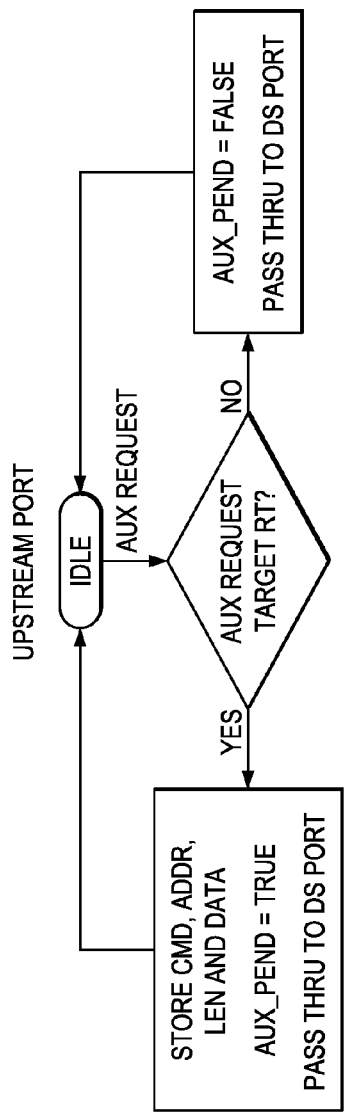
FIGS. 3-4 are state diagrams for one exemplary embodiment of a DisplayPort retimer device internal state machines for the AUX port.
Figure 4:
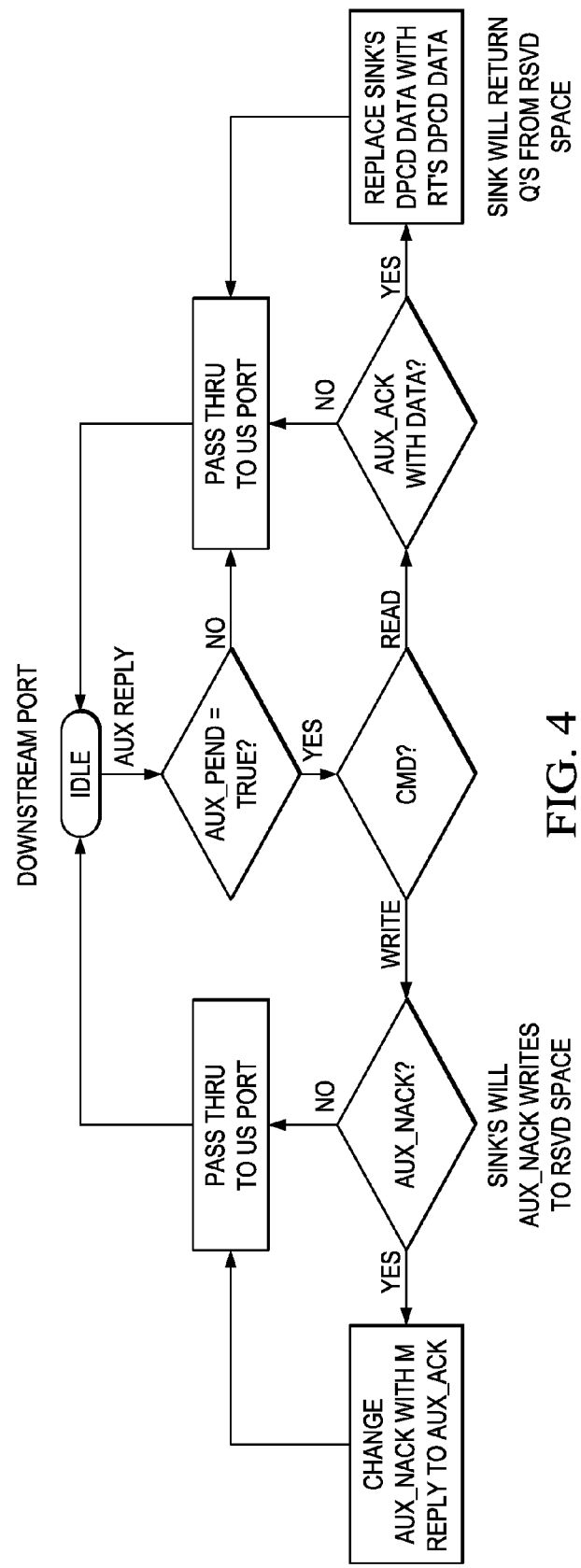

FIGS. 3 and 4 are state diagrams for one exemplary embodiment of DisplayPort retimer device internal state machines for the upstream AUX port 210 and downstream AUX port 212 respectively. The illustrated state machines are configured to perform the read/write operations described in further detail below, as described in more detail in the VESA DisplayPort Standard, Ver 1.3.

Table 1 defines an address map that may be used to locate DisplayPort configuration and capability data (DPCD) that can be accessed by a master using the AUX channel. Table 1 is backward compatible with legacy DisplayPort sinks and sources that comply with earlier versions of the DisplayPort Standard. The various types of configuration data specified in Table 1 are defined in the DisplayPort Standard Ver 1.3 and need not be described in further detail here; however, a few items that pertain to link training will be described in more detail below. For example, Table 2 defines a maximum link rate capability field that may be accessed at address 00001h. Note that when this capability is accessed on a sink node, any retimers that are present also "sniff" this address and modify the response from the sink node to provide the lowest common denominator of capability, as will be explained in more detail below.

While Table 1 describes particular types of configuration and capability data that may be accessed at defined locations in this example, other embodiments may implement different functionality with a different address map, for example.

TABLE 1

DisplayPort Configuration Data Address Map

| DPCD Address | DPCD field |
| --- | --- |
| 00000h through 000FFh | Receiver Capability |
| 00100h through 001FFh | Link Configuration |
| 00200h through 002FFh | Link/Sink Device Status |
| 00300h through 003FFh | Source Device-specific |
| 00400h through 004FFh | Sink Device-specific |
| 00500h through 005FFh | Branch Device-specific |
| 00600h through 006FFh | Link/Sink Device Power Control |
| 00700h through 007FFh | eDP-specific |
| 00800h through 008FFh | RESERVED (usage to be defined) |
| 01000h through 017FFh | Sideband MSG Buffers |
| 01800h through 01FFFh | RESERVED (usage to be defined) |
| 02000h through 021FFh | DPRX Event Status Indicator |
| 02200h through 022FFh | Extended Receiver Capability |
| 02300h through 022FFh | RESERVED (usage to be defined) |
| 03000h through 030FFh | Protocol Converter Extension |
| 03100h through 05FFFh | RESERVED (usage to be defined) |
| 60000h through 61CFFh | Multi-Touch (for eDP v1.4) |
| 61D00h through 67FFFh | RESERVED (usage to be defined) |
| 68000h through 69FFFh | HDCP 1.3 and HDCP2.2 |
| 6A000h through EFFFFh | RESERVED (usage to be defined) |
| F0000h through F02FFh | LT-tunable PHY Repeater |
| F0300h through FFEFFh | RESERVED (usage to be defined) |
| FFF00h through FFFFFh | MyDP-specific |

TABLE 2

Retimer Capability Field

| DisplayPort address | Definition | Read/Write over AUX channel |
| --- | --- | --- |
| 00001h | MAX_LINK_RATE<br>Maximum link rate of Main Link lanes = value × 0.27 Gbps<br>Bits 7:0 = MAX_LINK_RATE<br>Retimer must return the lowest common denominator of its own value and the downstream link value. | Read only |

In this embodiment, address range F0000h-F02FFh is indentified by the VESA DisplayPort Standard Ver 1.3 for use in accessing link tunable retimers. Legacy DisplayPort sinks treat this address range as a reserved address range. As can be seen in Table 1, there are several portions of the address map that are reserved for future use. A sink will typically respond to an access request to a reserved address with a NACK (no acknowledge) for a write transaction or with zero value data for a read transaction. While the address range F0000h-F02FFh is used for accessing link tunable retimers in this example, another embodiment may chose a different address range or a larger address range for additional features, for example.

Figure 5:
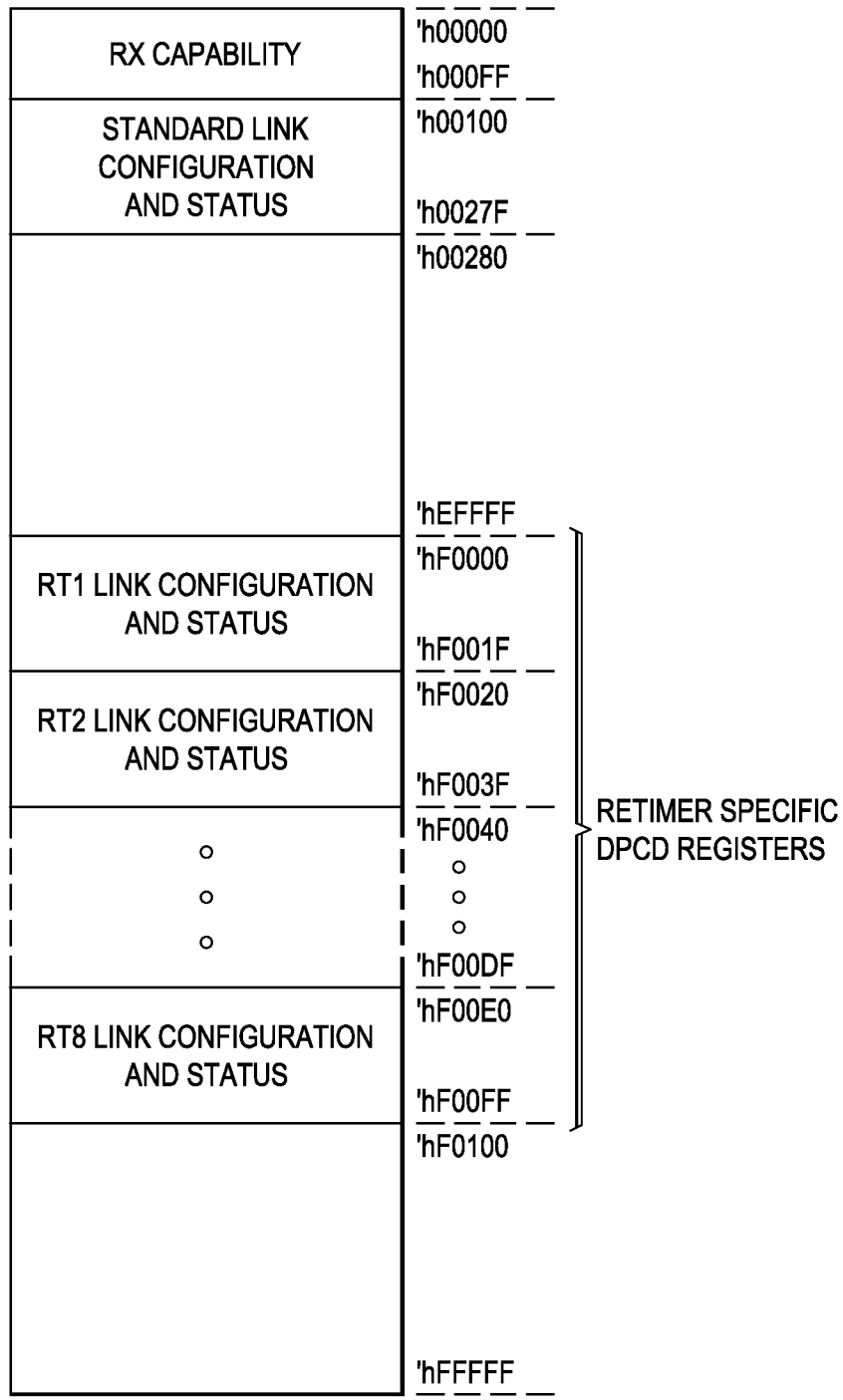
FIG. 5 is a memory map representing the addressable space of one or more exemplary DisplayPort retimer devices.

Referring now to FIG. 5, one exemplary memory map representing the addressable space of one or more exemplary DisplayPort retimer devices is presented. The exemplary memory map provides addressable space for up to eight (8) retimer devices (address space #hF0000 to #hF00FF). Those of ordinary skill will appreciate that the amount of memory allocated is purely illustrative; a greater or fewer number of devices may be supported with a larger or smaller memory space.

The exemplary memory map allows the DisplayPort master node to read and write the appropriate transmit parameters 230 for each retimer, referring again to FIG. 2. For example, the DisplayPort master may configure transmit parameters settings for each DisplayPort retimer device, such as, for example, drive strength (milliAmperes (mA)), amplitude (peak-to-peak voltage (Vodpp)), lane alignment, and timing. Thereafter, processor 218 in the DisplayPort retimer configures the retimer output differential drivers 208 in accordance with the configured transmit settings for normal operation.

In order to support legacy operation, the DisplayPort retimer can also "sniff" the transmit parameters from legacy bus operation. Specifically, if the DisplayPort master node does not read or write to the designated retimer memory space during link initialization, then the DisplayPort retimer may determine its transmit parameter settings based on the control traffic between the DisplayPort source and DisplayPort sink.

More generally, it will be appreciated by those of ordinary skill in the related arts that the present disclosure describes a scheme for allowing normally transparent devices to reuse otherwise reserved memory space. Specifically, in the described embodiments, transactions to restricted memory space of a DisplayPort sink may return null values. In response to transactions to a defined address, such as those defined in FIG. 5, the DisplayPort retimer may intelligently replace the null values with its own internal values. In this manner, the DisplayPort retimer does not impact legacy DisplayPort network operation.

Exemplary DisplayPort Master Node

Figure 6:
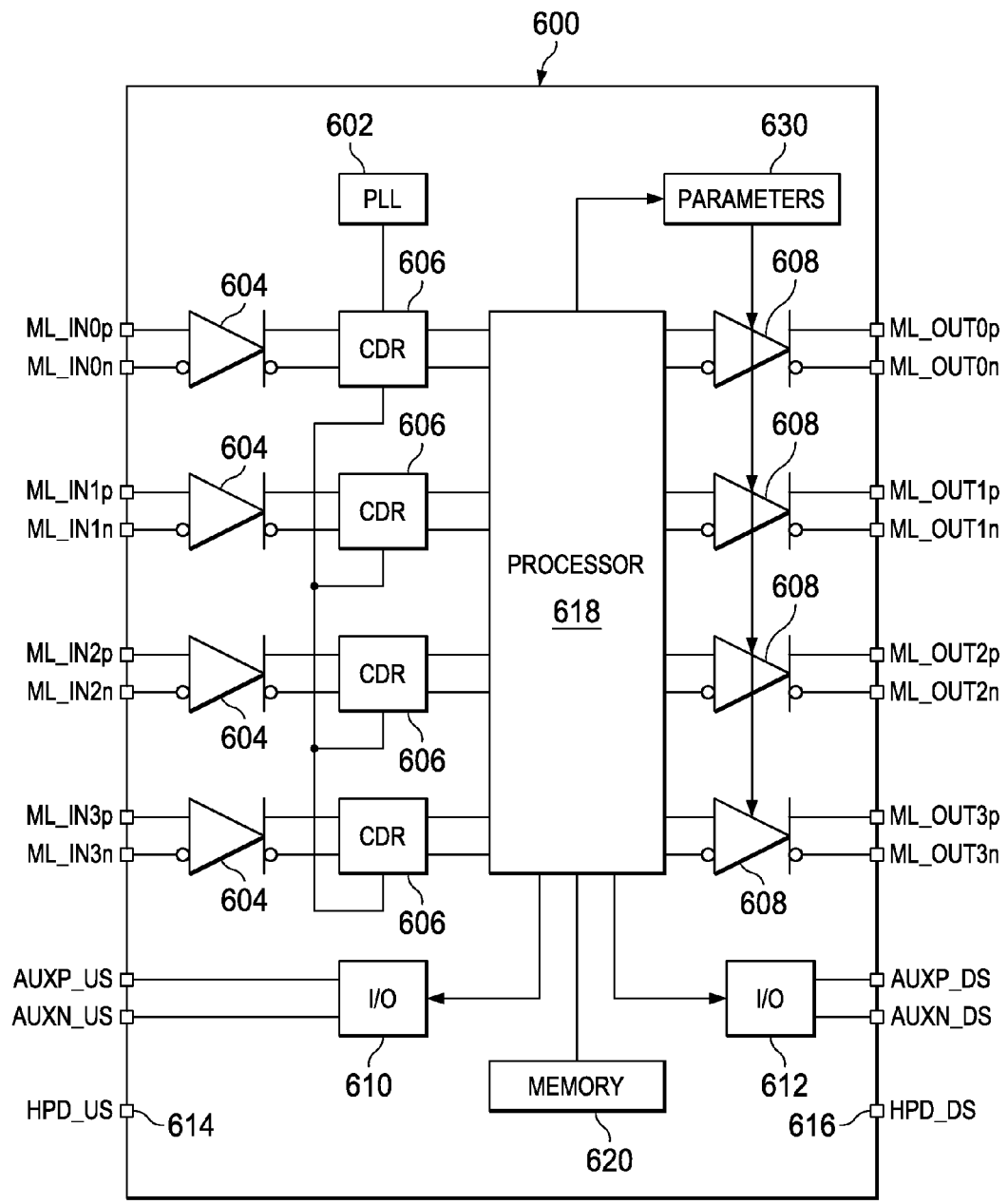
FIG. 6 is a logical block diagram of one exemplary embodiment of a DisplayPort master node device.

Referring now to FIG. 6, a block diagram of one exemplary DisplayPort master node device 600 is presented that may be used as master node 110 in FIG. 1. As shown, the master node device 600 includes a phase locked loop (PLL) 602, four (4) main link inputs 604 which each connect to a corresponding clock data recovery (CDR) element 606. The inputs 604 are routed to a processor 618. The processor 618 is coupled to an associated memory 620. The processor is connected to four output differential drivers 608. Also shown is an AUX upstream port 610, and an AUX downstream port 612, and a hot plug detect (HPD) upstream port 614 and an HPD downstream port 616. While the illustrated embodiment is shown with both source driver 608 and sink receiver 604 functionality for completeness, it is appreciated that actual implementations may be limited to just master functionality.

The processor 618 includes circuitry that is configured to execute one or more instructions stored within the memory subsystem 620. Output driver parameter storage 630 is coupled to processor 618 and controls the operation of output drivers 608 in a similar manner as described for the retimer output drivers.

Normal DisplayPort operation includes the provisioning of data from one or more DisplayPort sources to one or more DisplayPort sinks, as described in more detail in the DisplayPort Standard Ver 1.3. Common examples of data include, e.g., video, audio, etc. Data may be provided synchronously, asynchronously, or isochronously. In one exemplary embodiment, DisplayPort data comprises streaming video data including: video data organized in scan lines according to appropriate resolution (e.g., 480 p (720×480 progressive scan), 576 p (720×576 progressive scan), 720 p (1280×720 progressive scan), 1080i (1920×1080 split into two interlaced fields of 540 lines), 1080 p (1920×1080 progressive scan), 2160 p (3840×2160 progressive scan), 4320 p (7680×4320 progressive scan), 8640 p (15360×8640 progressive scan), etc.), vertical and horizontal blanking intervals, and data islands.

DisplayPort sources may dynamically generate content and/or retrieve content from tangible media. Common examples of dynamically generated content include, e.g., video recording and audio recording. Common examples of content retrieved from tangible non-transitory computer readable media include, without limitation, content stored via optical disk (e.g., compact disc (CD), digital video disc (DVD), and Blu-ray®) hard disk drive (HDD), flash, etc.

During link initialization, the DisplayPort master node is configured to determine the capabilities of a DisplayPort sink/source, such as supported functionality, speeds, etc., and detect the presence of one or more DisplayPort retimers. For example, link speed may be determined by reading address 00001h to obtain the maximum link rate of the main link lanes, as defined by Table 2. Thereafter, the DisplayPort master node is configured to perform an iterative training sequence for each "hop" of the topology. As used herein, the term "hop" refers without limitation to one segment of a total data path, where the segment is between two nodes selected from the source node, the sink node, and one or more intermediary node(s). For example, a hop may refer to a segment from a source node to a sink node, from a source node to a retimer node, or from a retimer node to a sink node. Here a "node" is a logical entity that independently generates/regenerates/receives data path signaling.

A DisplayPort master node is configured to determine a set of transmit parameters based on a set of training symbols. In one exemplary embodiment, a DisplayPort source master node generates training symbols and receives a reported recovered link quality from its connected node (i.e., the first hop). After training the first hop, the DisplayPort source master node may train the second hop via the first hop. In this manner, the DisplayPort source master node may train each hop of the total data path in isolation. Each hop of the total data path may be calibrated for the optimal transmit parameters to maximize efficiency, power consumption, and performance.

In some embodiments, the master node is fixed at the outset (based on, e.g., mechanical, electrical, or protocol enforcement). In other embodiments, the master node may be dynamically changed, e.g., via a deterministic scheme and/or arbitration.

Exemplary Read/Write Sequence

FIGS. 7-10 are ladder diagrams of exemplary DisplayPort read operations. As shown, the exemplary network includes a DisplayPort source operating as the master node 600, an intermediate LT-tunable DisplayPort retimer 200, and a DisplayPort sink 700.

In the first illustrated transaction (FIG. 7), the DisplayPort master node 600 initiates an auxiliary channel (AUX) read transaction that does not target the DisplayPort retimer 200. The AUX_RD_RQ (read request) is made for the first two entries of the DisplayPort Configuration Data (DPCD) of the DisplayPort sink 700 that are located at address 00100h, as defined by Table 1. The DisplayPort retimer 200 inspects the address of the auxiliary channel read request (AUX_RD_RQ) and determines that the read request is for the DisplayPort sink and passes the read request through. Responsive to the AUX_RD_RQ, the DisplayPort sink 700 responds with an AUX_ACK (successful acknowledgement) that includes the response (11, 22), which represents the contents of a two byte configuration data register accessed at address 00100h. The DisplayPort retimer 200 passes the successful acknowledgement back unmodified.

In the second illustrated transaction (FIG. 8), the DisplayPort master node 600 initiates an AUX read transaction that targets only the LT-tunable DisplayPort retimer 200. The AUX_RD_RQ is made for the first two entries of the DPCD of the DisplayPort retimer 200 at address F0000h, as defined by Table 1 and FIG. 5. The DisplayPort retimer 200 inspects the address of the AUX_RD_RQ and determines that the read request is only for the DisplayPort retimer 200 configuration data register; however the DisplayPort retimer 200 passes the read request through to the DisplayPort sink 700 so that the read request can traverse the entire data path. Responsive to the AUX_RD_RQ, the DisplayPort sink 700 responds with an AUX_ACK that includes the null response (00, 00) because the address F0000h is in a reserved address space from the perspective of a legacy sink 700, as described above. Responsive to receiving the null response, the DisplayPort retimer 200 modifies the contents of the response to an AUX_ACK with its own values (AA, BB) from its configuration data register. This replacement may be done by processor 218 performing read and write cycles, or by other means, such as: a multiplexor that may be controlled to pass either the data from the sink node or data from a repeater local register, for example.

In the third illustrated transaction (FIG. 9), the DisplayPort master node 600 initiates a read transaction that targets both the DisplayPort retimer 200 and the DisplayPort sink 700. The AUX_RD_RQ is made for the first two entries of the DPCD of the DisplayPort sink 700 and the third and fourth entries of the DPCD of the DisplayPort retimer 200. In this example, assume a four byte read request is made to address 0000Eh. Assume that address 00010h-00011h is snooped by a repeater. The DisplayPort retimer 200 inspects the address of the AUX_RD_RQ and determines that the read request is for both the DisplayPort retimer 200 and the DisplayPort sink 700. The DisplayPort retimer 200 passes the read request through to the DisplayPort sink 700 so that the read request can traverse the entire data path. Responsive to the AUX_RD_RQ, the DisplayPort sink 700 responds with an AUX_ACK that includes the proper response for the first set of bytes at address 0000Eh-0000Fh and null values for the remaining query (11, 22, 00, 00). Responsive to receiving the partial response, the DisplayPort retimer 200 modifies the contents of the partial response to complete the response (11, 22, 50, 01).

In the fourth illustrated transaction (FIG. 10), the DisplayPort master node 600 initiates a read transaction that targets a "conflict" address of the DisplayPort retimer 200 and the DisplayPort sink 700. Generally, as used herein, a "conflict" occurs where the DisplayPort retimer 200 cannot return the DisplayPort sink's 700 response. One example of a conflict is where the DisplayPort sink 700 supports more capabilities or a higher data rate than one or more intermediary DisplayPort retimers 200. Under these circumstances, the DisplayPort source 600 is apprised of the limiting node (i.e., the least capable DisplayPort retimer 200). As shown, the AUX_RD_RQ is made for the fifth entry of the DPCD of the DisplayPort sink 700, at address 00100h, for example. The DisplayPort retimer 200 inspects the address of the AUX_RD_RQ and determines that the read request is for a conflict address of the DisplayPort sink 700. Responsive to the AUX_RD_RQ, the DisplayPort sink 700 responds with an AUX_ACK that includes the proper response (55). Responsive to receiving the response, the DisplayPort retimer 200 determines that the DisplayPort sink 700 has provided a response which exceeds the retimer's capabilities. Accordingly, the DisplayPort retimer 200 modifies the contents of the response to a value it can support (44).

Figure 11:
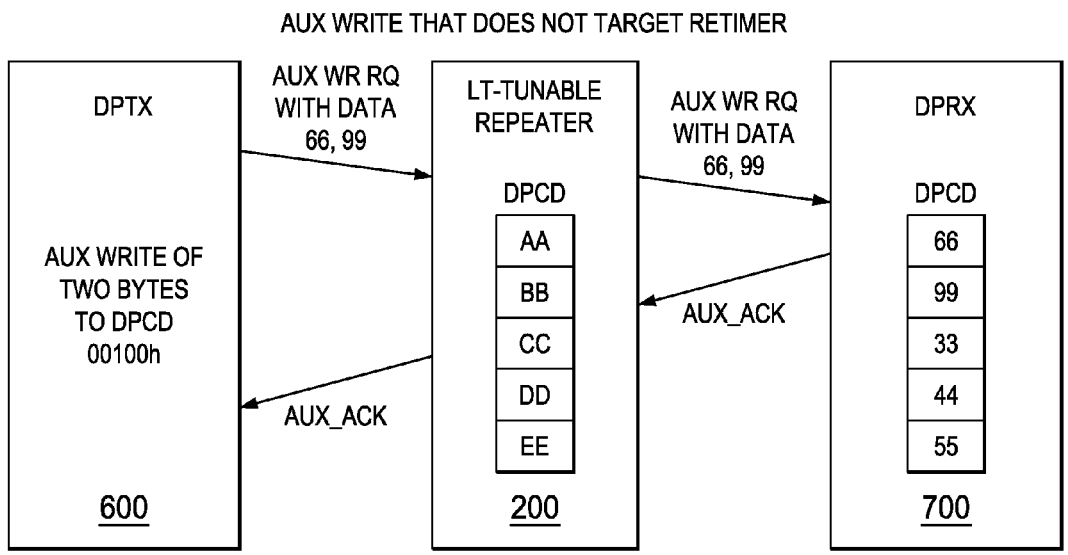
FIGS. 11-12 are ladder diagrams of exemplary DisplayPort write operations.
Figure 12:
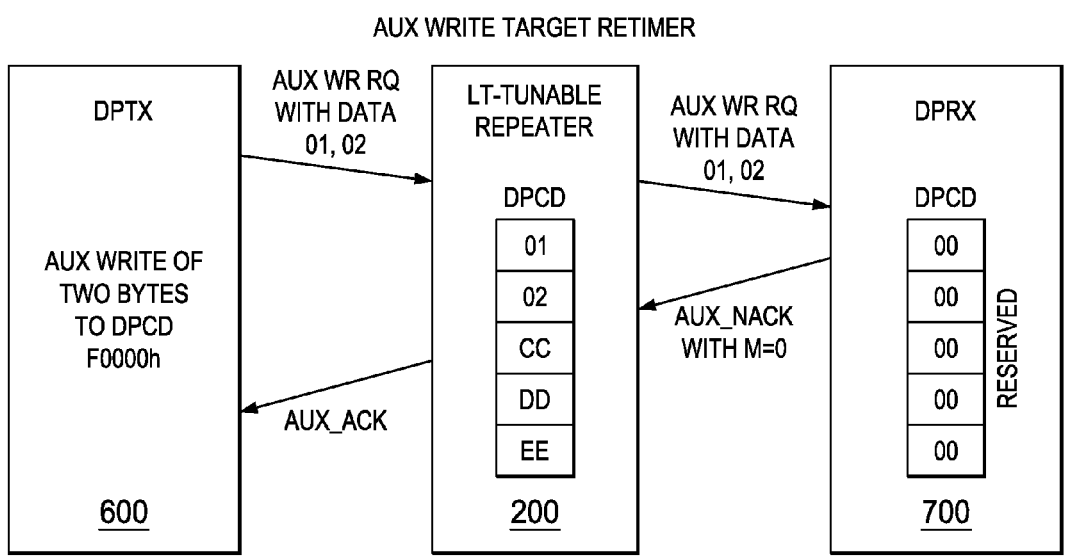

Referring now to FIGS. 11-12, logical ladder diagrams of exemplary DisplayPort AUX write operations are illustrated. As shown, the exemplary network includes a DisplayPort source operating as the master node 600, an intermediate DisplayPort retimer 200, and a DisplayPort sink 700.

In the first illustrated transaction (FIG. 11), the DisplayPort master node 600 initiates a write transaction that does not target the DisplayPort retimer 200. The AUX_WR_RQ (AUX channel write request) is made for the first two entries of the DisplayPort Configuration Data (DPCD) of the DisplayPort sink 700 at address 00100h, for example, with the values (66, 99). The DisplayPort retimer 200 inspects the contents of the AUX_WR_RQ and determines that the write request is for the DisplayPort sink 700 and passes the write request through. Responsive to the AUX_WR_RQ, the DisplayPort sink 700 writes its corresponding values, and responds with an AUX_ACK (successful acknowledgement). The DisplayPort retimer 200 passes the successful acknowledgement back unmodified.

In the second illustrated transaction (FIG. 12), the DisplayPort master node 600 initiates a write transaction that targets only the DisplayPort retimer 200. The AUX_WR_RQ is made for the first two entries of the DPCD of the DisplayPort retimer 200 at address F0000h, for example. The DisplayPort retimer 200 inspects the contents of the AUX_WR_RQ and determines that the write request is only for the DisplayPort retimer 200. However, the DisplayPort retimer passes the write request through to the DisplayPort sink 700 so that the write request can traverse the entire data path. Responsive to the AUX_WR_RQ, the DisplayPort sink 700 responds with an AUX_NACK that includes the null response (M=0, where M indicates the number of data bytes successfully written). Responsive to receiving the null response, the DisplayPort retimer 200 writes its internal values and modifies the contents of the response to an AUX_ACK.

Exemplary Hot-Plug Detect (HPD)/Discovery Sequence

Referring now to FIGS. 13A-B, logical ladder diagrams of the exemplary DisplayPort discovery operation are illustrated. As shown, the exemplary network includes a DisplayPort source operating as the master node 600 also referred to as a DisplayPort transmitter (DPTX), two intermediate DisplayPort retimers (200A, 200B), and a DisplayPort sink 700 (also referred to as a DisplayPort receiver (DPRX)).

Table 3 illustrates an exemplary DPCD set of registers that may be used during a discovery process. These registers are repeated at the same address location in each LT-tunable repeater. An LT-tunable repeater that receives a reply of all 0 data from its downstream device (i.e., the one closest to the DPRX) must replace the received data with its own data. An LT-tunable Repeater that receives a reply of non-zero data must update the received data based on the required behavior for each DPCD register

TABLE 3

Example Repeater DPCD Registers

| DPCD Address | Register |
|---|---|
| F0000h | LT-Tunable repeater field data structure revision |
| F0001h | Maximum link rate of the repeater example values<br>06h = 1.62 Gbps/lane.<br>0Ah = 2.7 Gbps/lane.<br>14h = 5.4 Gbps/lane.<br>1Eh = 8.1 Gbps/lane. |
| F0002h | Repeater count<br>40h = 2 PHY Repeaters are present.<br>20h = 3 PHY Repeaters are present.<br>...<br>01h = 8 PHY Repeaters are present.<br>This field defaults to 80h when the data response received on a downstream facing port (DFP) is 0.<br>For the case in which a non-zero value is received on a DFP, the value of this field is data received on the DFP divided by 2. |
| F0003h | Repeater mode<br>55h = Transparent mode (default).<br>AAh = Non-transparent mode. |
| F0010h | Training pattern set: defines when link training is in progress and which training pattern is being used. All repeaters snoop this same address and may maintain a duplicate copy for control purposes. |

As shown at FIG. 13A, when a DisplayPort sink 700 is first connected or during a power-up sequence, other powering event, etc., the DisplayPort sink 700 asserts the Hot-Plug Detect (HPD) signal 1300. The HPD signal is propagated upstream through each of the retimers (200A, 200B) to master node 600 without modification.

As shown in FIG. 13B, when a DisplayPort master node 600 receives the HPD signaling, it may send an AUX_RD_RQ (read request) 1302 to determine the initial capabilities of the DisplayPort sink 700 and whether there are any attached DisplayPort retimers. As shown, the DisplayPort sink 700 returns its DPCD RX Capability (DPCD_REV=#13h, MAX_LINK_RATE=#1Eh, MAX_LANE_COUNT=#2h) in an AUX_ACK (successful response) 1304. The retimer specific values (retimer ID (RT_ID), retimer count (RT_CNT)) are returned as null values.

The second DisplayPort retimer 200B verifies that it can support the DPCD RX Capability, and additionally modifies null values to identify the RT_ID as #50h and the RT_CNT (retimer count) to #80h to indicate that there is one retimer in AUX_ACK 1306. The first DisplayPort retimer 200A verifies that it can support the DPCD RX Capability, and increments the RT_CNT (retimer count) to #40h to indicate that there are two retimers in AUX_ACK 1308.

In this example, each retimer in series increments the retimer count value by dividing the RT_CNT by 2 as defined in Table 3; the initial value is 80h. The retimer that is closest to the DisplayPort master will have the highest number. Additionally, when a retimer is unable to support the DPCD RX Capability, it can modify the appropriate value. This informs the DisplayPort master of the "weakest link", thereby ensuring that the entire data path is operational, albeit at a lower capability than the DisplayPort source/sink may support.

Figure 7:
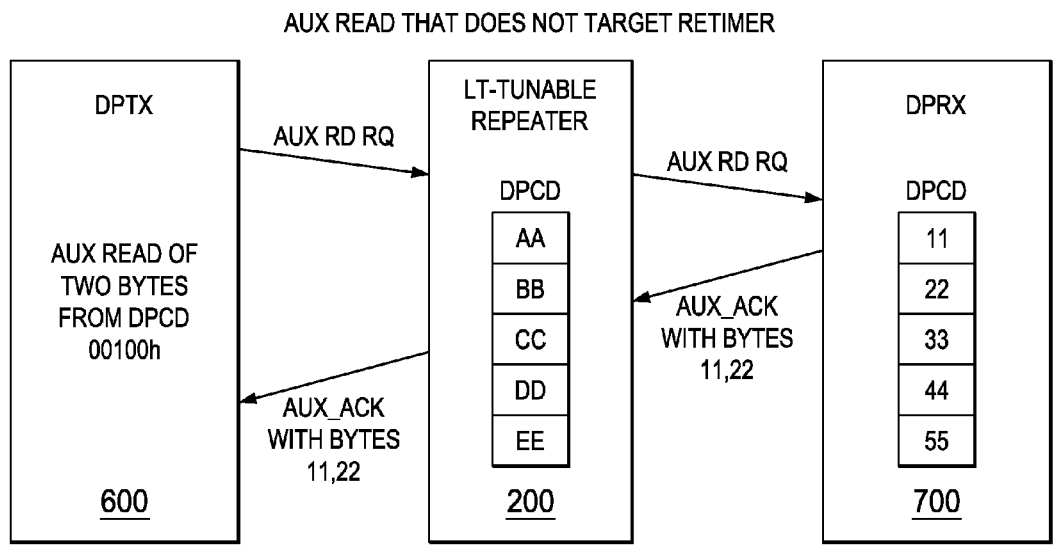
FIGS. 7-10 are ladder diagrams of exemplary DisplayPort read operations.
Figure 8:
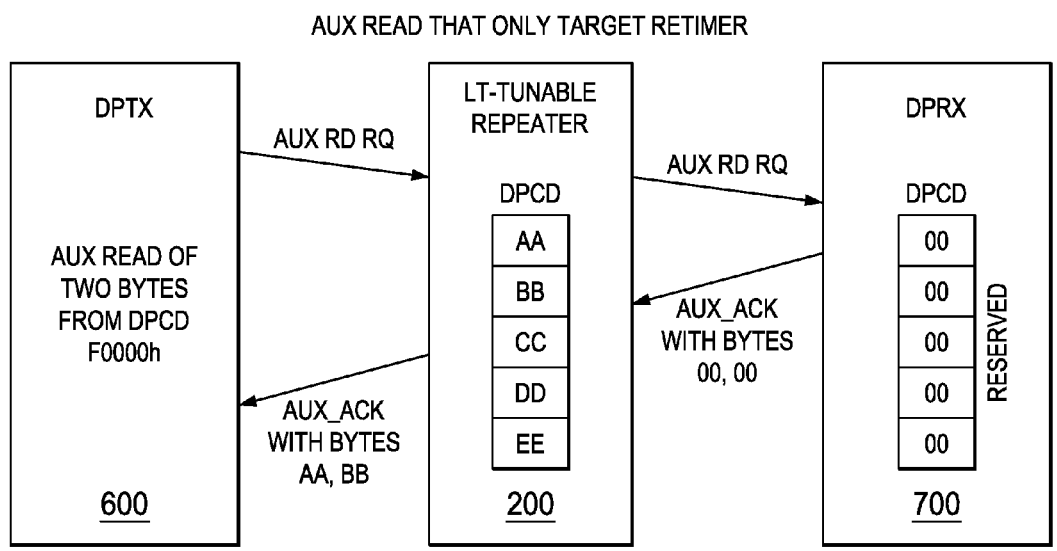
Figure 9:
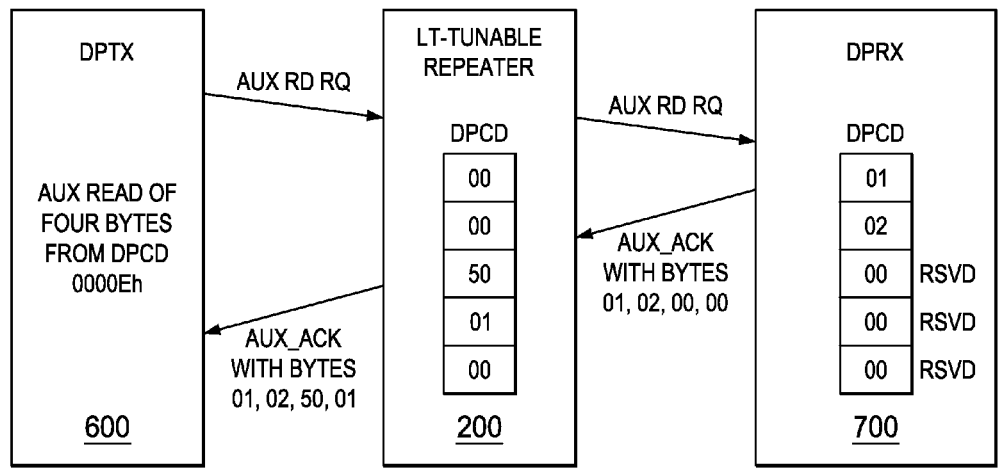
Figure 10:
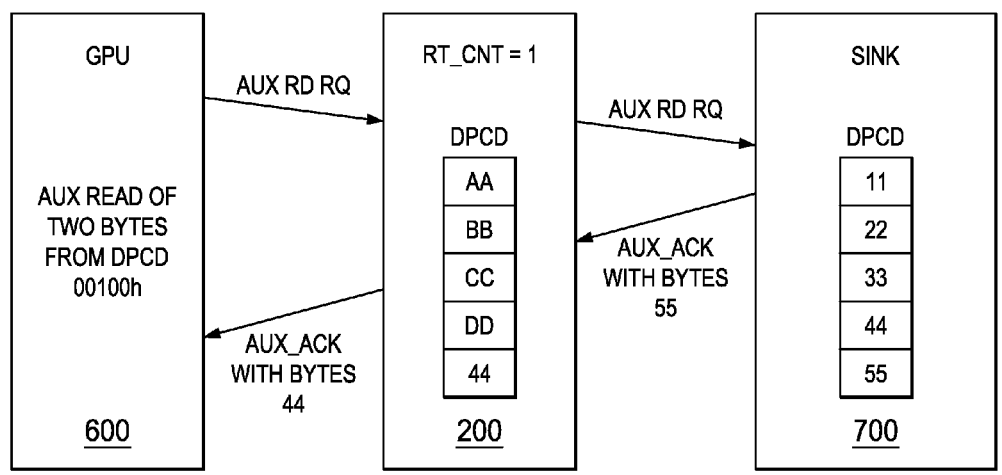

While in this example, the RT_CNT value is divided by 2 (right shifted) to increment the number of repeaters, in another embodiment, the RT_CNT may be simply incremented, for example. While in this example, a single AUX read transaction was performed on an address that both the sink and the repeaters responded to such as illustrated in FIG. 10, in another embodiment, a first AUX read transaction may be performed to a sink only address as illustrated in FIG. 7 to determine the sink capabilities and then a second AUX read transaction may be performed to a retimer address as illustrated in FIG. 8 to discover any repeaters that may be present, for example. In another embodiment, a single AUX read transaction may be performed as illustrated in FIG. 9 to obtain sink capabilities and to discover if any repeaters are present, for example.

Once the DisplayPort HPD/discovery operation successfully completes, the DisplayPort master may initiate a Link Initialization sequence, as described below.

Exemplary Link Initialization Sequence

Figure 14:
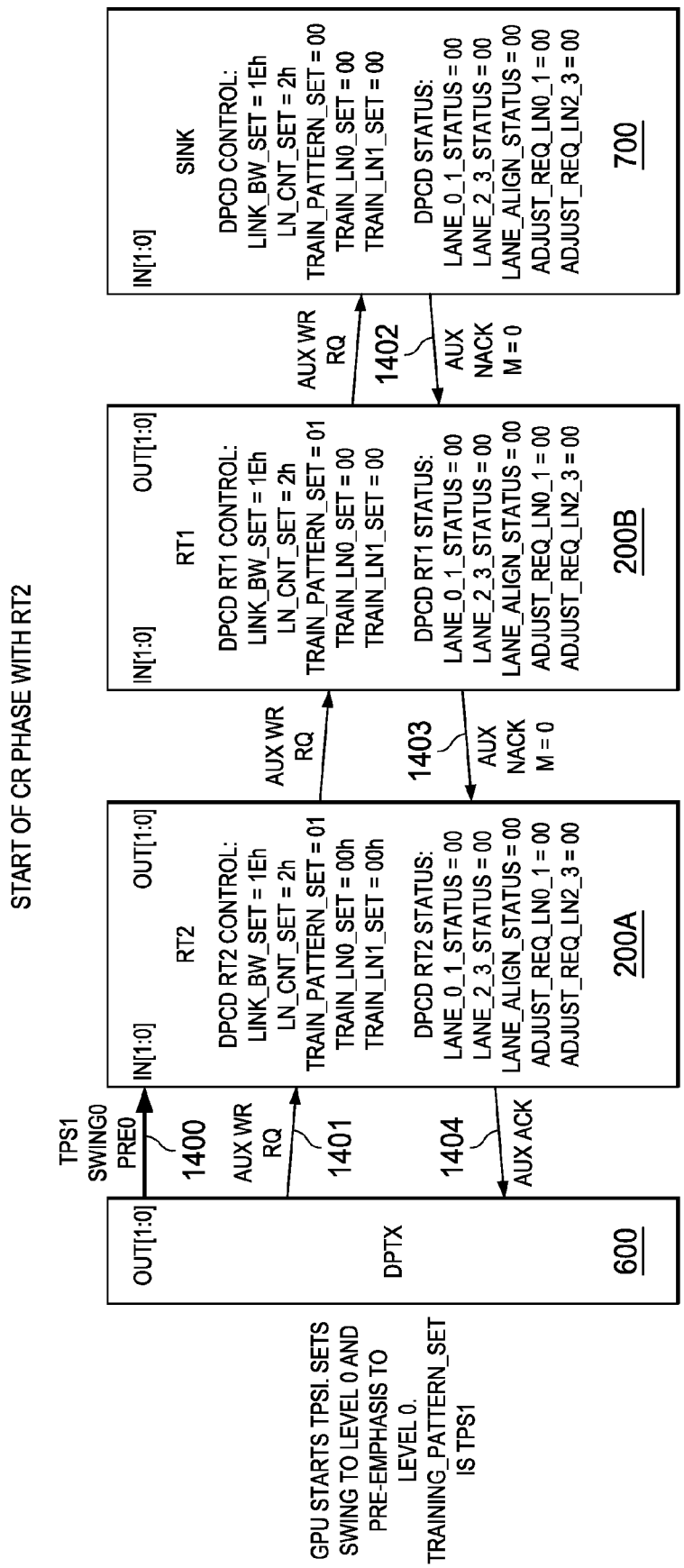
FIGS. 14-22 are logical ladder diagrams of an exemplary DisplayPort clock recovery link initialization operation.

Referring now to FIG. 14, an exemplary network is illustrated that includes a DisplayPort source operating as the master node 600, two intermediate DisplayPort retimers (200A, 200B), and a DisplayPort sink 700. In other embodiments, there may only be a single retimer, or there may be several retimers, for example. The techniques described below allow each individual link segment between each network node to be individually trained for optimized signal transmission through the entire network.

Table 4 describes several DPCD registers that may be included in each sink node. These registers may be used to control the training operation. The registers are mapped into an address range that is active on each sink. Additionally, each LT-tunable repeater includes a similar set of registers mapped into the repeater address space (F0000h-F02FFh)

TABLE 4

Sink DPCD Registers used for control of link Initialization

| DPCD Address | Definition |
|---|---|
| 00100h | Link bandwidth set: defines the max bandwidth that will be used |
| 00101h | Lane count set: defines how many lanes are in use |
| 00102h | Training pattern set: indicates when link training is in progress and what training pattern is being used |
| 00103h | Training lane 0 set: defines voltage swing and pre-emphasis value requested for lane 0 |
| 00104h | Training lane 1 set: defines voltage swing and pre-emphasis value requested for lane 1 |
| 00105h | Training lane 2 set: defines voltage swing and pre-emphasis value requested for lane 2 |
| 00106h | Training lane 3 set: defines voltage swing and pre-emphasis value requested for lane 3 |

FIGS. 14-22 illustrate link initialization for the clock recovery (CR) step. The following procedure is equally applicable to subsequent stages of DisplayPort link initialization, such as, for example, equalization (EQ), symbol lock (SL), and inter-lane alignment (AL). Referring back to FIG. 2, each tunable retimer 200 may have one or more CDR circuits that receive a signal transmitted from an upstream node and recover a clock signal and data from the signal. Each sink node also has similar CDR circuits. In order for the system to operate correctly, each CDR must be able to lock on to the incoming data stream using a training pattern and correctly recognize signal transitions. The general operation of CDRs is well known and need not be described in further detail here. In order to improve locking, various transmission parameters of the upstream transmitter may be adjusted during a training initialization phase in order to improve the quality of the signal received by the CDR. For example, differential signal swing and frequency band pre-emphasis may be adjusted to compensate for transmission path losses.

As shown at FIG. 14, the DisplayPort master node 600 performs link initialization for only the first hop of the data path (i.e., between the master node 600 and the retimer 200A) by transmitting 1400 a training pattern TPS1 on data lanes 0 and 1. In this embodiment, a TPS1 is a repeating sequence of "01010101". Initially, the voltage swing in the source transmitters may be set to SWING=0, PRE_EMPHASIS=0 (ADJUST_REQ_LN0_1=#00h). Source 600 may then perform an AUX_WR_RQ (write request) 1401 to the DPCD registers (Training_Pattern_Set, Train_Lane_0, Train_lane_1) on retimer 200A to instruct the retimer to perform training.

Setting the Training_Pattern_set DPCD register at address F0010h in retimer 200A will cause it to perform CDR training using the TPS1 training pattern provided by master node 600. As mentioned in Table 3, all repeaters snoop this address, so second retimer 200B will also begin to CDR using the TPS1 training pattern provided by retimer 200A. Both retimers may then adjust their respective ADJUST_REQUEST_LANEx DPCD register as needed. This is a reserved address range for sink 700; therefore sink 700 is not aware that training of the first hop is being performed. The write request is passed through the second retimer 200B. Sink 700 generates an AUX_NACK null response 1402, and the second retimer 200B provides an unmodified null response 1403. The first retimer 200A selects an ACK value based on its analysis of write packet 1401 and generates an AUX_ACK 1404 with status pertaining to retimer 200A.

Figure 15:
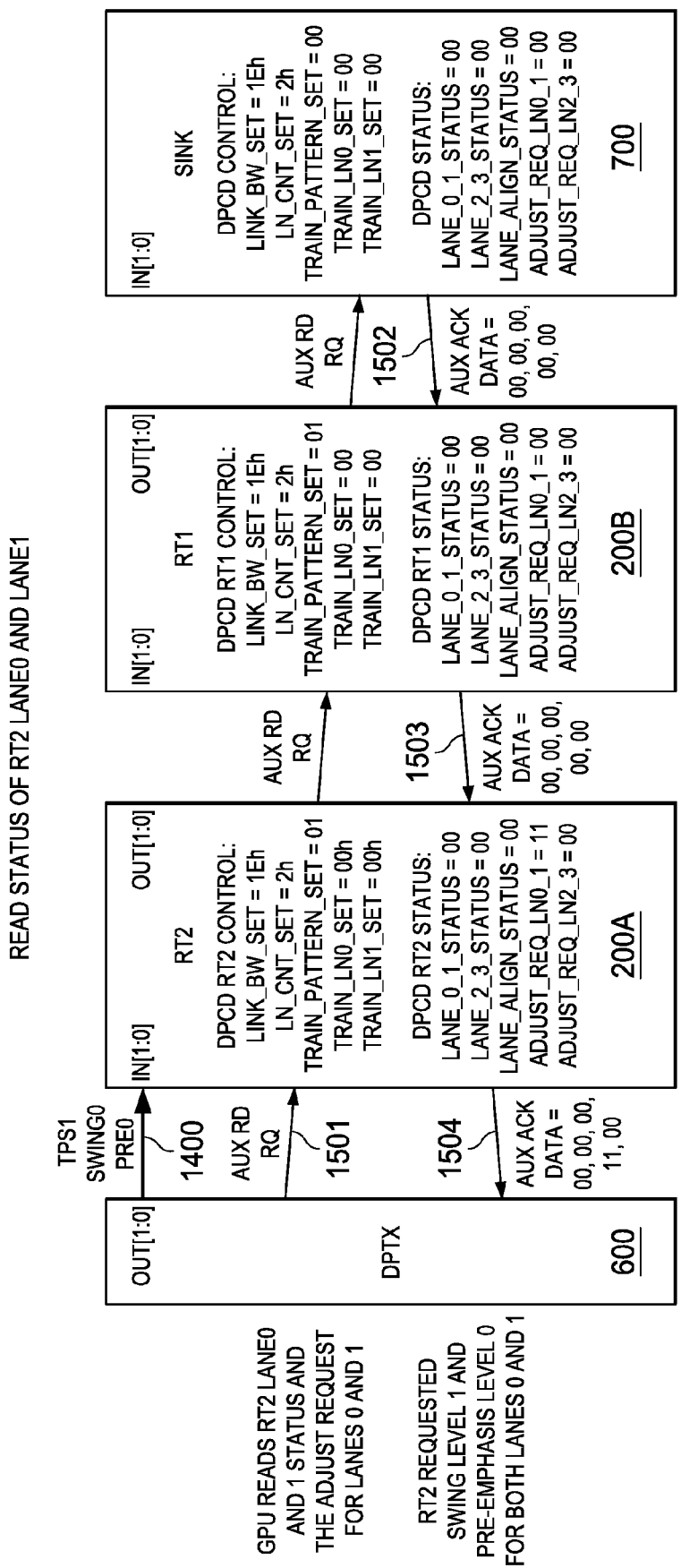

As shown at FIG. 15, the DisplayPort master node 600 may read the first retimer 200A test results in response to training pattern 1400. The DisplayPort master node 600 performs an AUX_RD_RQ (read request) 1501 to the DPCD registers of retimer 200A for LANE0 and LANE1 status to determine if an adjustment request has been generated by retimer 200A. The read request is passed through the second retimer 200B and the sink 700 unchanged. Sink 700 generates the AUX_ACK null response 1502 and the second retimer 200B provides the unmodified null response 1503. The first retimer 200A reads its status values and generates an AUX_ACK (successful acknowledgment) 1504 and may indicate a request for an adjustment to SWING and/or to PRE_0 EMPHASIS. In this example, retimer 200A requests a Swing Level 1 and Pre-emphasis Level 0 for both lanes 0 and 1.

Figure 16:
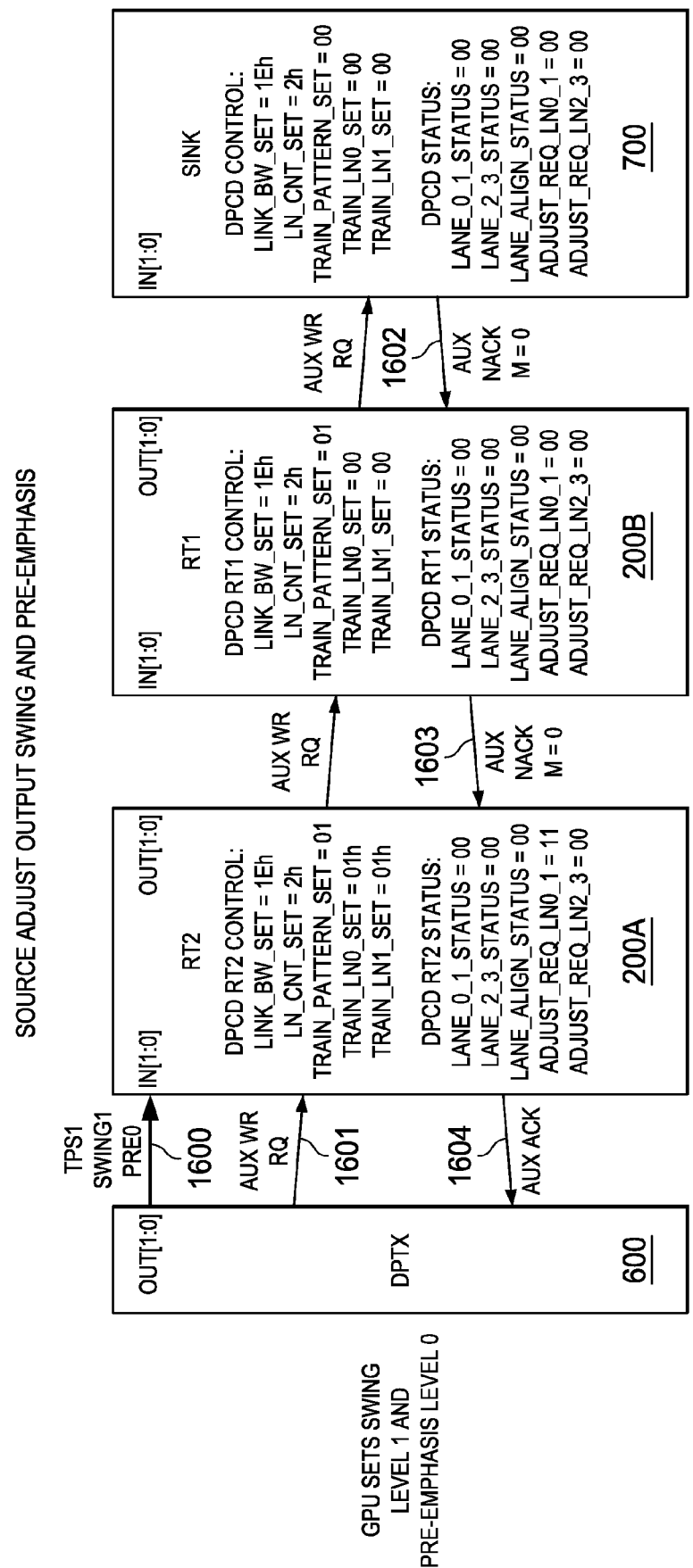

As shown at FIG. 16, the DisplayPort master node 600 adjusts it data transmitters for lanes 0 and 1 to have a SWING of 1 and PRE_EMPHASIS of 0 (ADJUST_REQ_LN0_1=#22h) and transmits a training pattern 1600 on lanes 0 and 1 using the new transmitter parameters. An AUX write request 1601 is sent to the DPCD registers on retimer 200A with the new parameters. This write transaction is passed through the second retimer 200B and the sink 700 unchanged. Sink 700 generates the AUX_NACK null response 1602, and the second retimer 200B provides an unmodified null response 1603. The first retimer 200A selects an ACK value based on its analysis of write packet 1601 and generates an AUX_ACK 1604 with status pertaining to retimer 200A.

Figure 17:
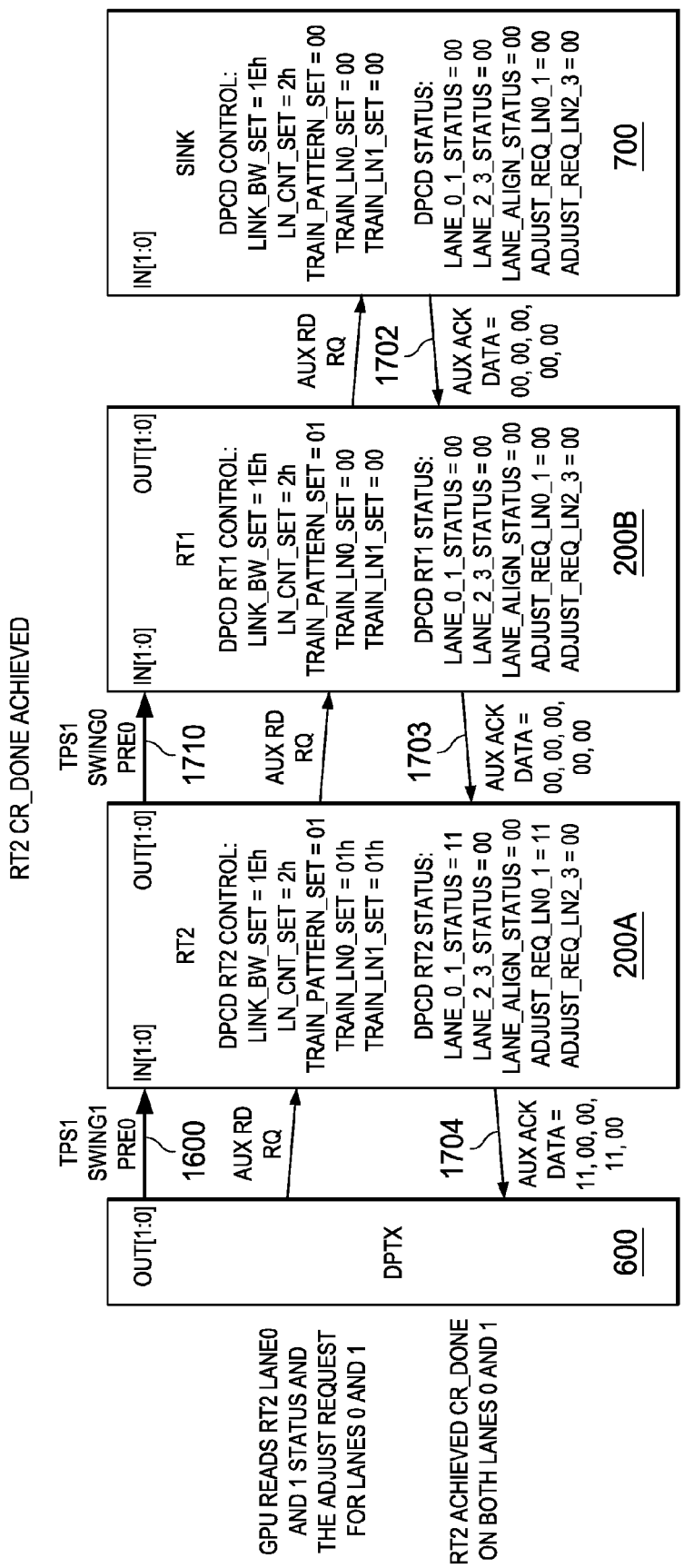

As shown at FIG. 17, the DisplayPort master node 600 reads the first retimer 200A clock recovery test results based on training pattern 1600. The DisplayPort master node 600 performs an AUX_RD_RQ for LANE0 and LANE1 status, and any further adjustment request. The read request is passed through the second retimer 200B and the sink 700 unchanged. Sink 700 generates the AUX_ACK null response 1702; the second retimer 200B provides the unmodified null response 1703. The first retimer 200A reads its status values and generates an AUX_ACK (successful acknowledgment). In this example, the result LANE_0_1_STATUS=#11h indicates a successful CR training. Therefore, the DisplayPort master node 600 has completed clock recovery training for lanes 0 and 1 of the first hop successfully, and proceeds to the second hop. At this point, retimer 200A may begin transmitting a training packet 1710 on data lanes 0 and 1 that is received by retimer 200B.

Figure 18:
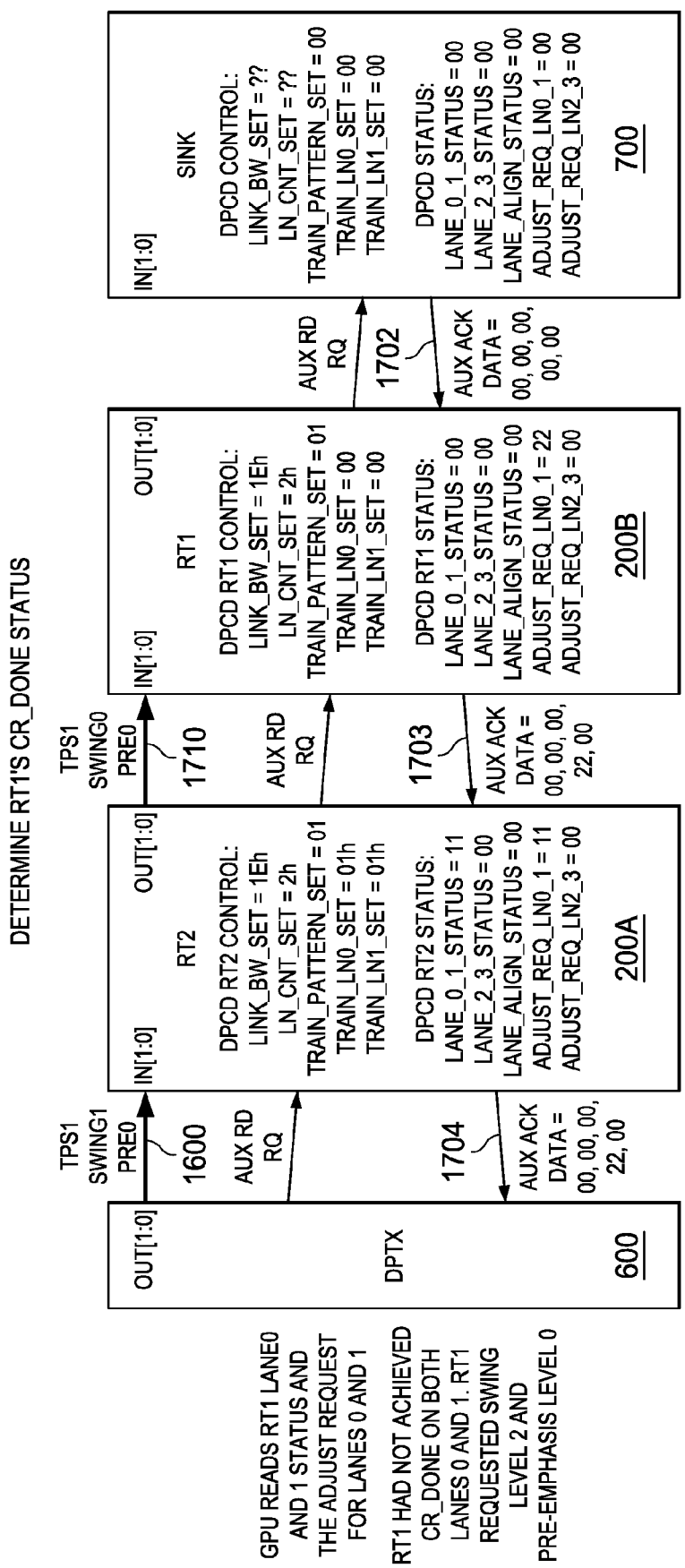

As shown at FIG. 18, the DisplayPort master node 600 may perform link initialization for only the second hop of the data path (i.e., between the first retimer 200A and the second retimer 200B). The DisplayPort master node 600 may perform an AUX_RD_RQ 1801 to the DPCD registers located in address range F0000h-F0001F on retimer 200B to determine what the second retimer 200B has requested for SWING and PRE_EMPHASIS based on training pattern 1710 provided by retimer 200A. The read request is passed through the sink 700 and first retimer 200A unchanged. Sink 700 generates the AUX_ACK null response 1702 and the first retimer 200A does not modify the response 1703 of the second retimer 200B. The second retimer 200B generates an AUX_ACK (successful acknowledgment) based on training pattern 1710. In this example, retimer 200B requests the SWING be set to 2 and PRE_EMPHASIS to 0 (ADJUST_REQ_LN0_1=#22h).

While training the second hop, the first hop retains its trained link configuration. Moreover, once the second hop is successfully CR trained, the third hop (i.e., between the second retimer 200B and the DisplayPort sink 700) may be CR trained.

Figure 19:
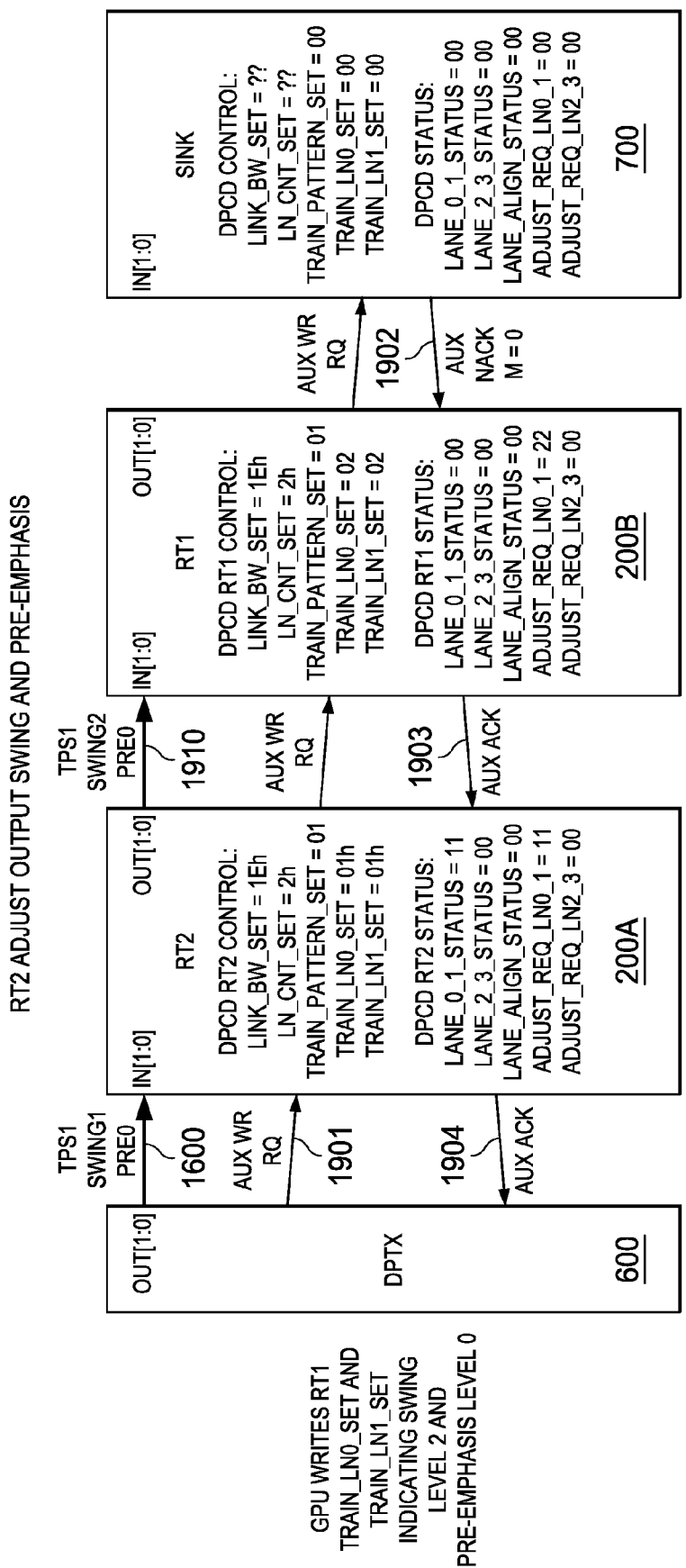

As shown at FIG. 19, retimer node 200A adjusts it data transmitters for lanes 0 and 1 to have a SWING of 2 and PRE_EMPHASIS of 0 (ADJUST_REQ_LN0_1=#22h) and transmits a training pattern 1910 on lanes 0 and 1 using the new transmitter parameters. An AUX write request 1901 is sent to the DPCD registers on retimer 200B with the new parameters. This write transaction is passed through the first retimer 200A and the sink 700 unchanged. Sink 700 generates the AUX_ACK null response 1902. The second retimer 200B selects an ACK value based on its analysis of write packet 1901 and generates an AUX_ACK 1903 with status pertaining to retimer 200B. The first retimer 200A provides an unmodified response 1904 back to source 600.

Figure 20:
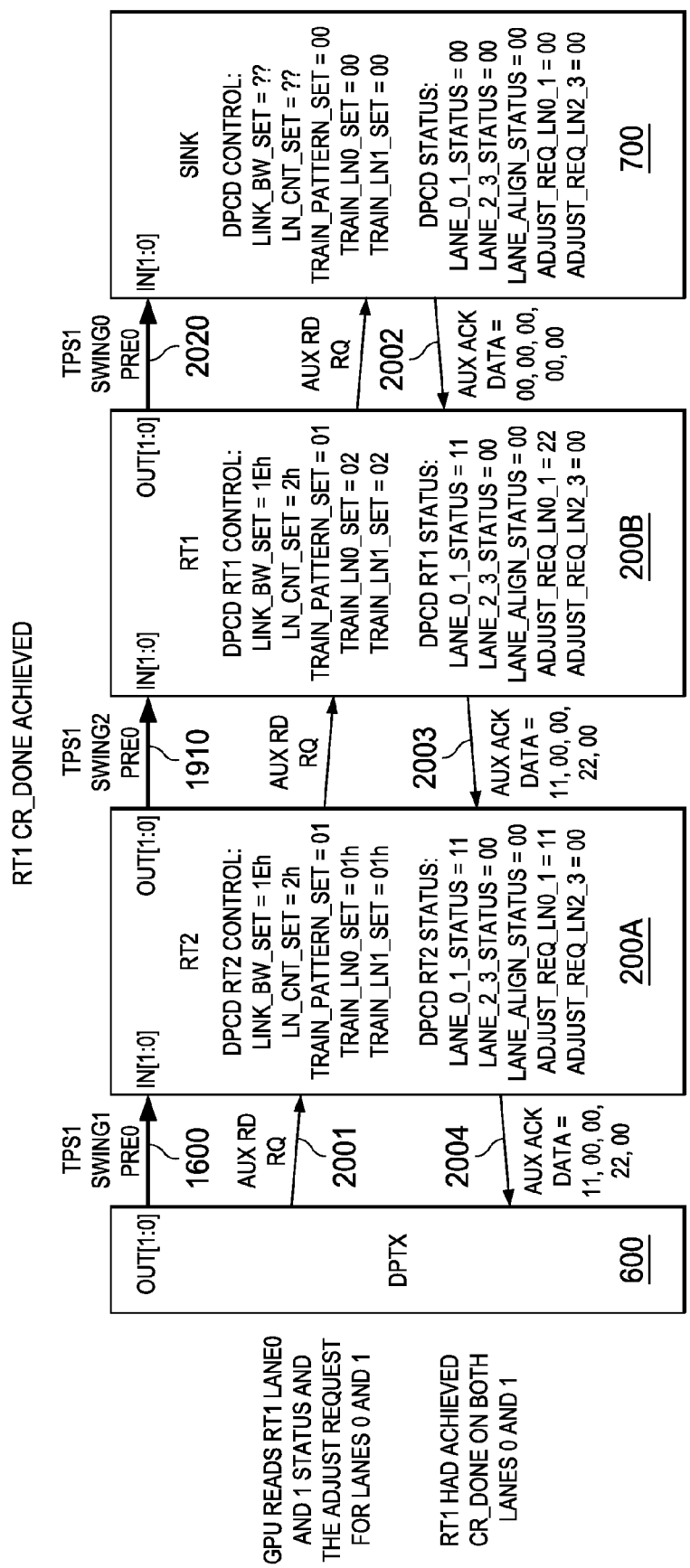

As shown at FIG. 20, the DisplayPort master node 600 reads the second retimer 200B clock recovery test results based on training pattern 1910. The DisplayPort master node 600 performs an AUX_RD_RQ 2001 for LANE0 and LANE1 status, and any further adjustment request. The read request is passed through the first retimer 200A and the sink 700 unchanged. Sink 700 generates the AUX_ACK null response 2002 and the first retimer 200A provides the unmodified response 2004. The second retimer 200B reads its status values and generates an AUX_ACK (successful acknowledgment) 2003. In this example, the result LANE_0_1_STATUS=#11h indicates a successful CR training. Therefore, the DisplayPort master node 600 has completed clock recovery training for lanes 0 and 1 of the second hop successfully, and may proceed to the third hop. At this point, retimer 200B may begin transmitting a training packet 2020 on data lanes 0 and 1 that is received by sink 700.

Figure 21:
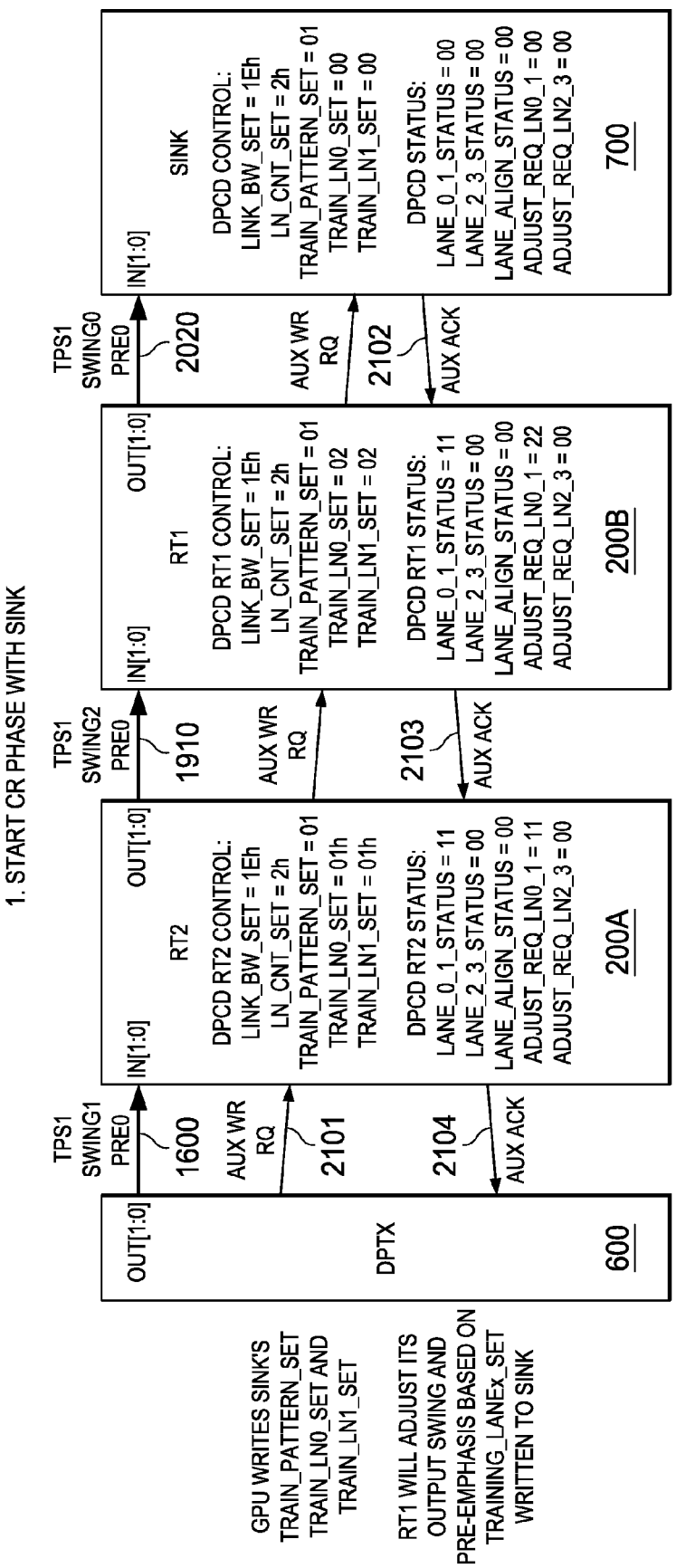

As shown at FIG. 21, the DisplayPort master node 600 may perform link initialization for only the third hop of the data path (i.e., between the second retimer 200B and the sink 700). Source 600 may start a CR phase of link training with sink 700 by writing to sink 700's DPCD registers located at address range 00100-001FFh, for example. The retimers may snoop the writes to the DPCD registers of the sink 700. An AUX write request 2101 may be sent to the DPCD registers on sink 700 to start the link training. This write transaction is passed through the first retimer 200A and the second retimer 200B unchanged. Sink 700 generates the AUX_ACK response 2102 with status pertaining to sink 700. The second retimer 200B provides an unmodified response 2103. The first retimer 200A provides an unmodified response 2104 back to source 600.

Figure 22:
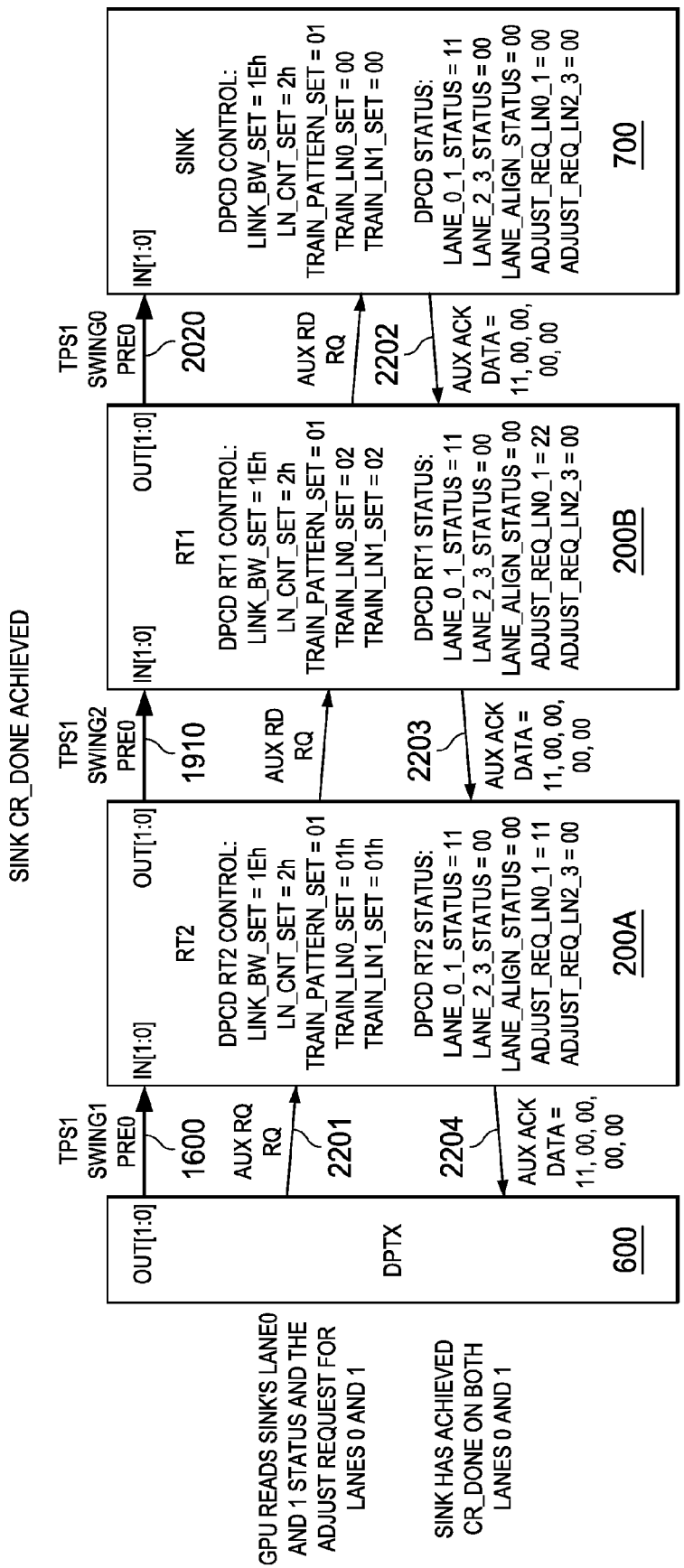

As shown at FIG. 22, the DisplayPort master node 600 may perform an AUX_RD_RQ 2201 to the DPCD registers on sink 700 to determine what the sink 700 has requested for SWING and PRE_EMPHASIS based on training pattern 2020 provided by retimer 200B. The read request is passed through first retimer 200A and second retimer 200B unchanged. Sink 700 generates the AUX_ACK response (successful acknowledgment) 2102 based on training pattern 2020. The second retimer passes an unmodified AUX_ACK 2103 and the first retimer forwards an unmodified AUX_ACK 2104 to source 600. In this example, sink 700 does not request a change because it has successfully acquired a CR_DONE result.

While training the third hop, the first hop and the second hop retain their trained link configurations. In this manner, each segment of the data path is separately trained in order to optimize performance of each segment.

If there are more than two data lanes, the above process may be repeated for the other data lanes. Once all of the data lanes have been trained to optimize the CR operation on each node, source 600 may perform link training for another parameter, such as equalization (EQ). Equalization involves adjusting the frequency response of the link segments in order to obtain a flat frequency response through the link and thereby minimize signal distortion. During this phase of training, the transmitter in each node may be adjusted to emphasize a particular range of frequencies in order to compensate for transmission losses occurring on that range of frequencies. Voltage swing on the differential links may also be adjusted.

Figure 23:
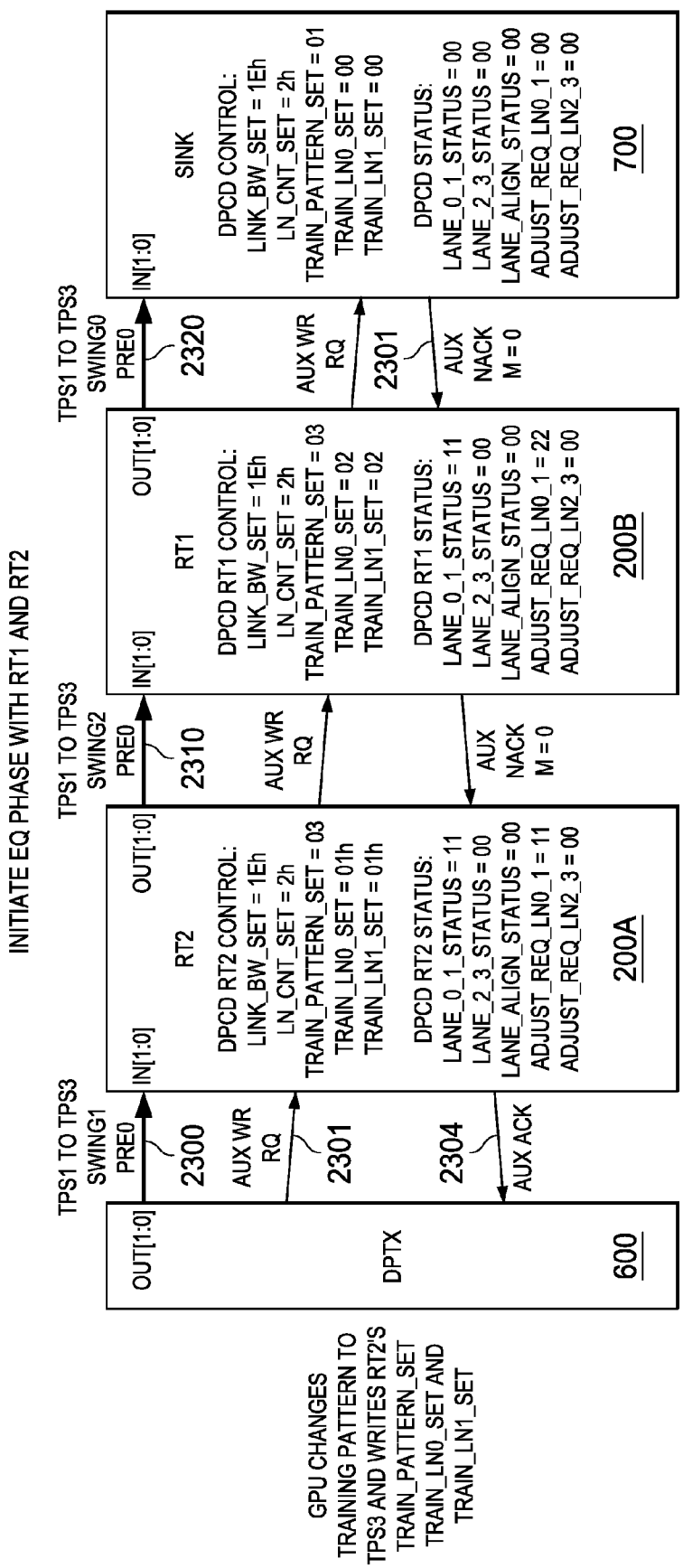
FIGS. 23-32 are logical ladder diagrams of an exemplary DisplayPort equalization link initialization operation.

FIGS. 23-32 are logical ladder diagrams of an exemplary DisplayPort equalization link initialization operation. As shown in FIG. 23, equalization link training may proceed after the CR training phase is completed. Each node maintains the transmit parameters determined during the CR training, but a new training pattern may be used. In this embodiment, several training patterns are defined by the DisplayPort standard. A pattern referred to as TPS3 contains a sequence that includes some occurrences of symbols that produce five one bits in a row and five zero bits in a row. Various patterns may be used in different embodiments. The occurrence of sequences of the same data bit may be used to determine when symbol locking has correctly occurred.

Source 600 may transmit 2300 a TPS3 training pattern on data lanes 0 and 1 of the first segment. Retimer 200A may repeat the transmission 2310 of training pattern TPS3 on the second segment, and retimer 200B may repeat the transmission 2320 on the third segment. Source 600 may then perform an AUX_WR_RQ (write request) 2301 to the DPCD registers (Training_Pattern_Set, Train_Lane_0, Train_lane_1) on retimer 200A to instruct the retimer to perform training. As described above, the write request will percolate down the chain to sink 700, which will respond with an AUX_NACK 2301. The NACK will then percolate up the chain and retimer 200A will convert it to an AUX_ACK 2304 and provide relevant status.

Setting the Training_Pattern_Set DPCD register at address F0010h in retimer 200A will cause it to perform symbol locking using the TPS3 training pattern provided by source 600. As mentioned in Table 3, all retimers snoop this address, so second retimer 200B will also begin to perform symbol locking using the TPS3 training pattern provided by retimer 200A. Both retimers may then adjust their respective ADJUST_REQUEST_LANEx DPCD register as needed.

Figure 24:
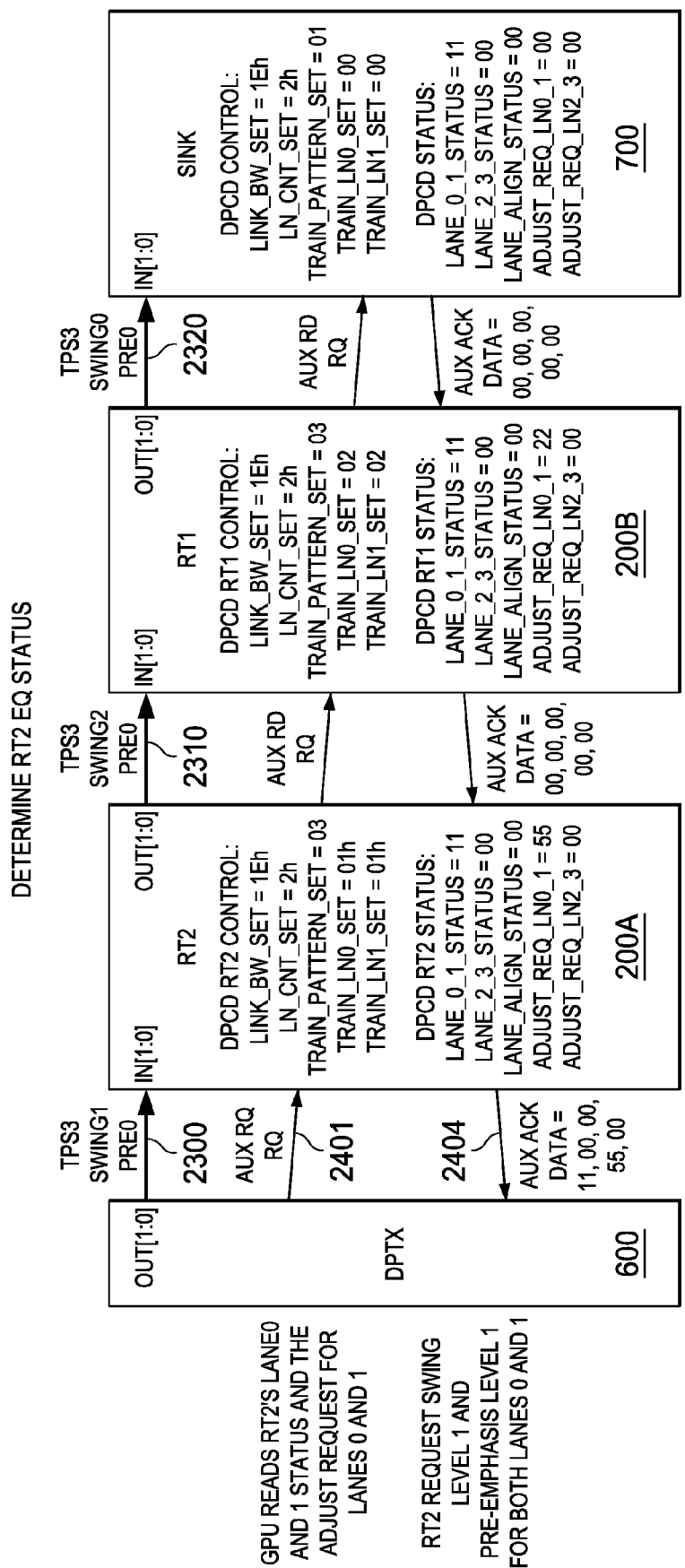

As shown in FIG. 24, source 600 may then read the first retimer 200A test results in response to training pattern 2300. The DisplayPort master node 600 performs an AUX_RD_RQ (read request) 2401 to DPCD registers of retimer 200A for LANE0 and LANE1 status to determine if an adjustment request has been generated by retimer 200A. The read request percolates through the chain as described in more detail above and is returned to source 600. In this example, a change in pre-emphasis is requested by retimer 200A.

Figure 25:
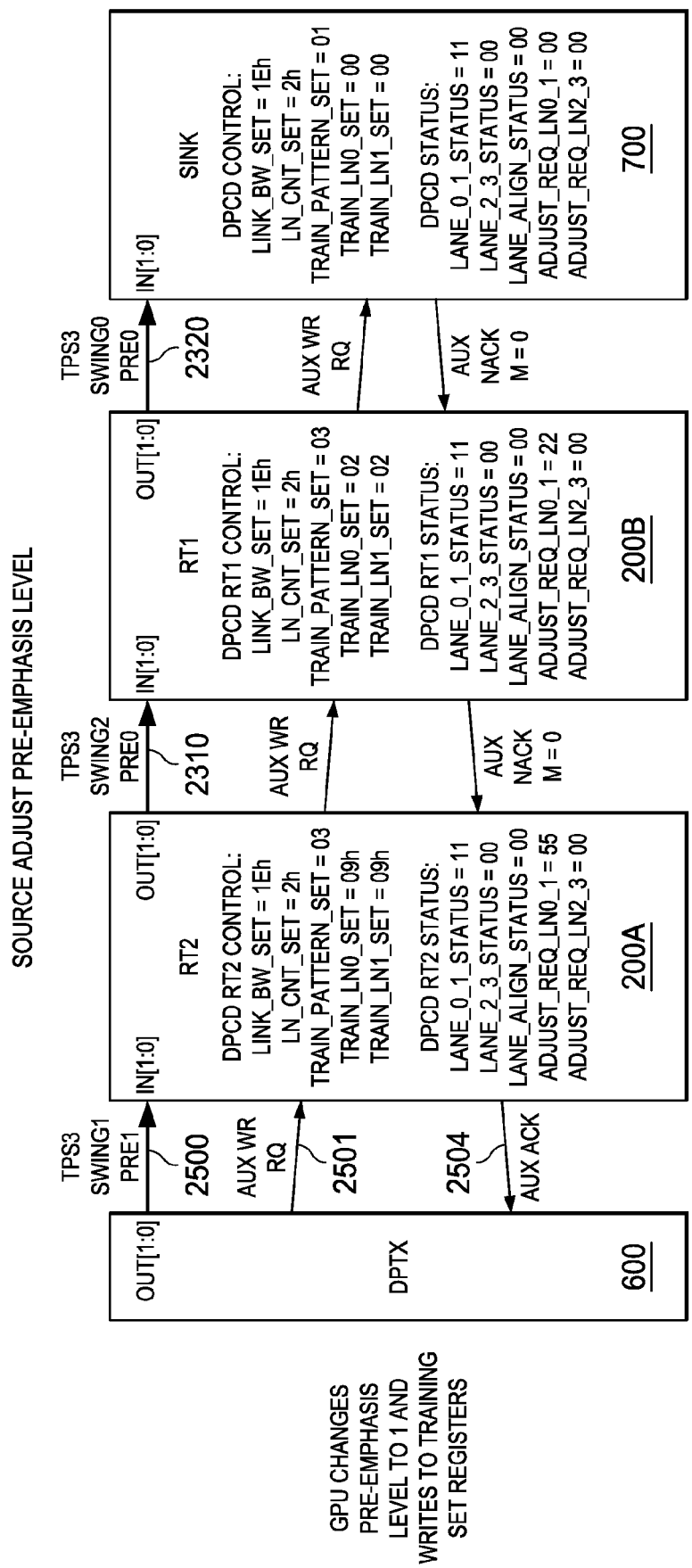

As shown in FIG. 25, source 600 changes its data transmitters for lanes 0 and 1 to have a SWING of 1 and PRE_EMPHASIS of 1 and transmits a training pattern TPS3 2500 on lanes 0 and 1 using the new transmitter parameters. An AUX write request 2501 is sent to the DPCD registers on retimer 200A with the new parameters; which percolates through the chain and returns an AUX-ACK to source 600 as described above.

Figure 26:
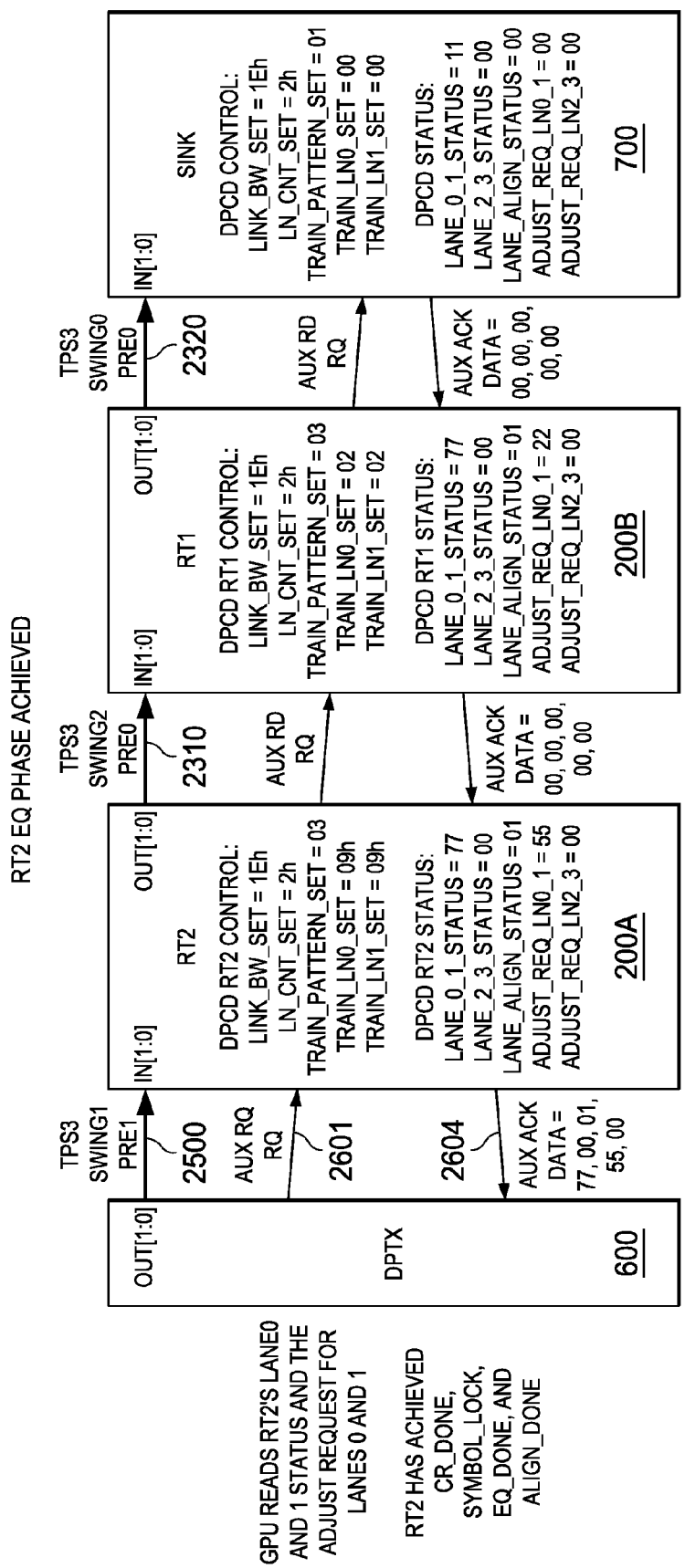

As shown in FIG. 26, source 600 may then again read the retimer 200A test results in response to training pattern 2500. The DisplayPort master node 600 performs an AUX_RD_RQ (read request) 2601 to DPCD registers of retimer 200A for LANE0 and LANE1 status to determine if an adjustment request has been generated by retimer 200A. The read request percolates through the chain as described in more detail above and is returned to source 600. In this example, retimer 200A has achieved symbol lock, equalization is done, and alignment is done so no additional changes are required for the transmitters in source 600.

Figure 27:
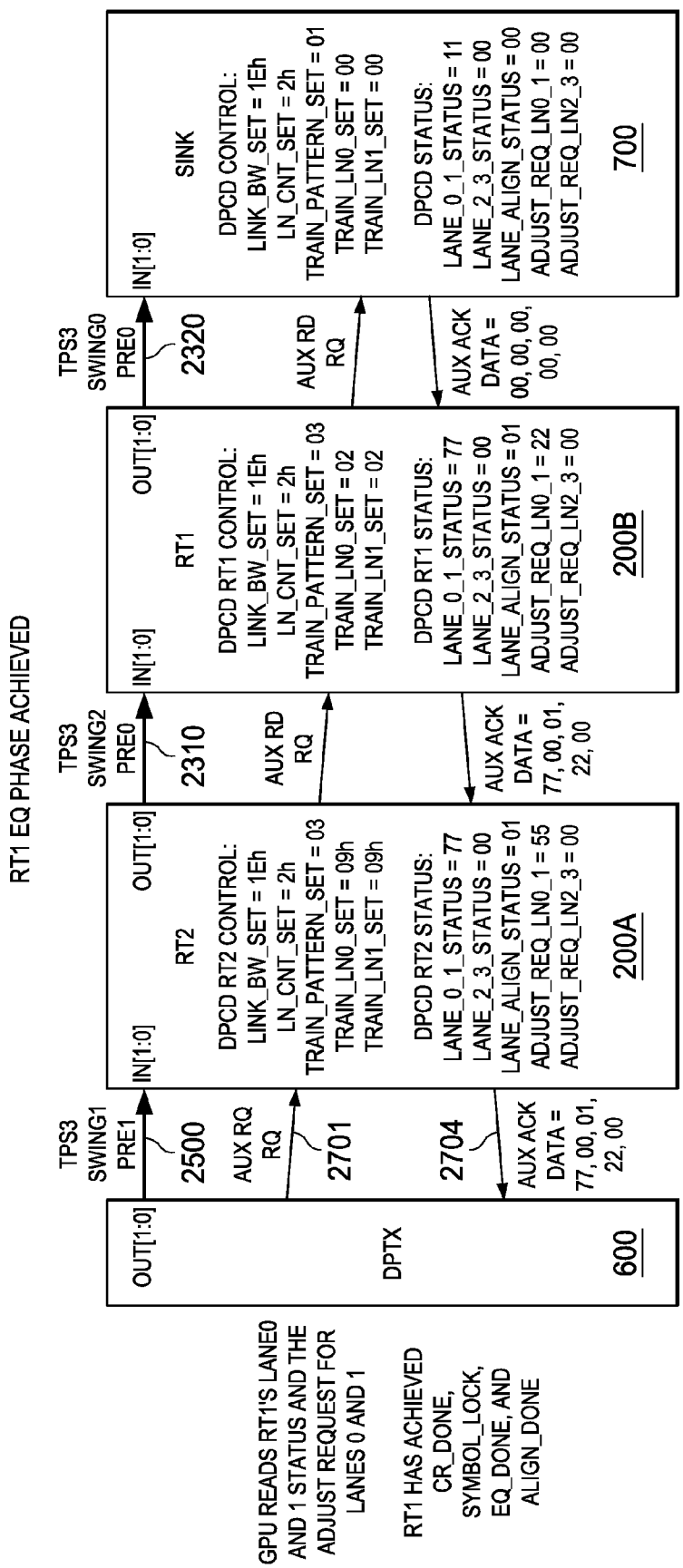

As shown in FIG. 27, source 600 may then read the retimer 200B test results in response to training pattern 2310. The DisplayPort master node 600 performs an AUX_RD_RQ (read request) 2701 to DPCD registers of retimer 200B for LANE0 and LANE1 status to determine if an adjustment request has been generated by retimer 200B. The read request percolates through the chain as described in more detail above and an AUX-ACK 2704 is returned to source 600. In this example, retimer 200B has achieved symbol lock, equalization is done, and alignment is done so no additional changes are required for the transmitters in retimer 200B.

Figure 28:
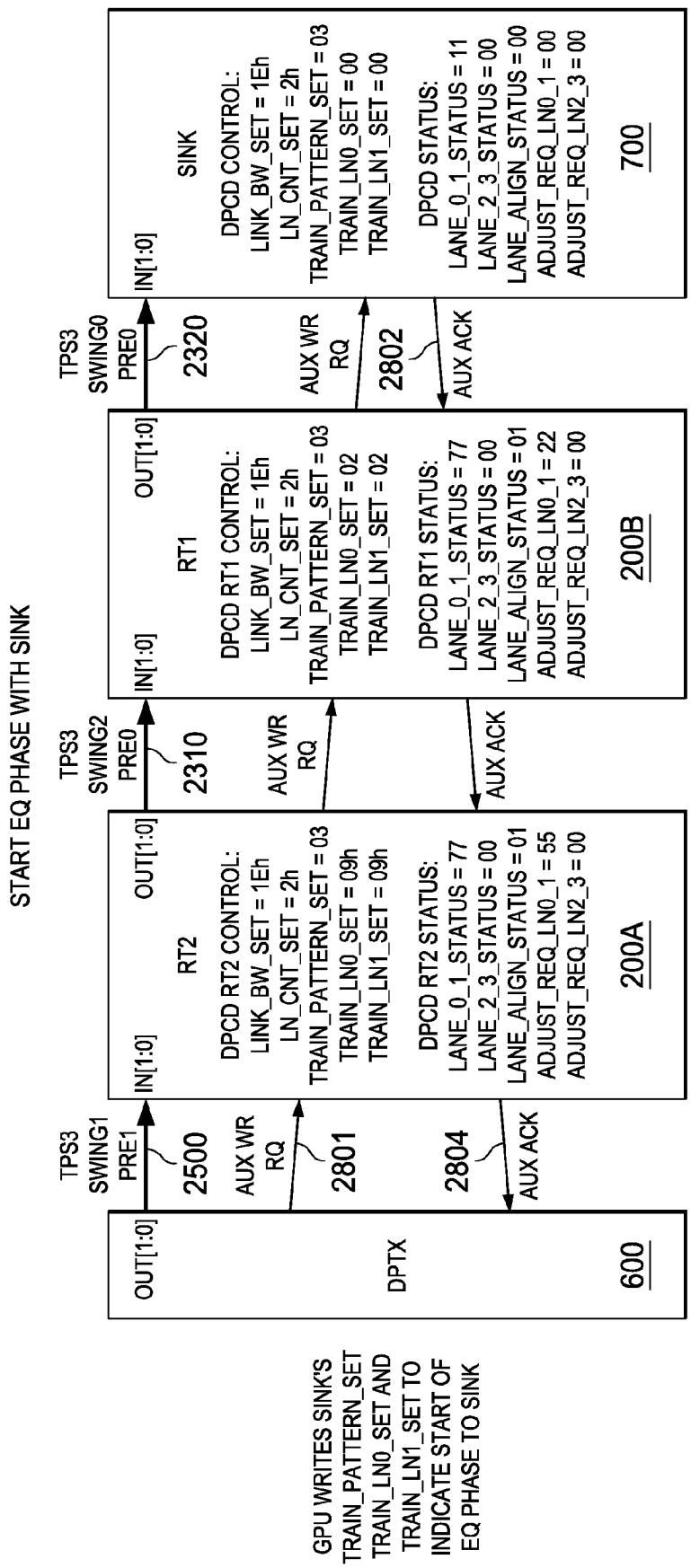

As shown in FIG. 28, source 600 may then perform an AUX_WR_RQ (write request) 2801 to the DPCD registers (Training_Pattern_Set, Train_Lane_0, Train_lane_1) on sink 700 to instruct sink 700 to perform training using the TPS3 2320 provided by retimer 200B. As described above, the write request will percolate down the chain to sink 700, which will respond with an AUX_ACK 2802. The ACK will then percolate up the chain and retimer 200A will pass unmodified AUX_ACK 2804 to source 600.

Setting the Training_Pattern_set DPCD register at address 00102h in sink 700 will cause it to perform symbol locking using the TPS3 training pattern provided by retimer 200B. Sink 700 may then adjust its ADJUST_REQUEST_LANEx DPCD register as needed.

Figure 29:
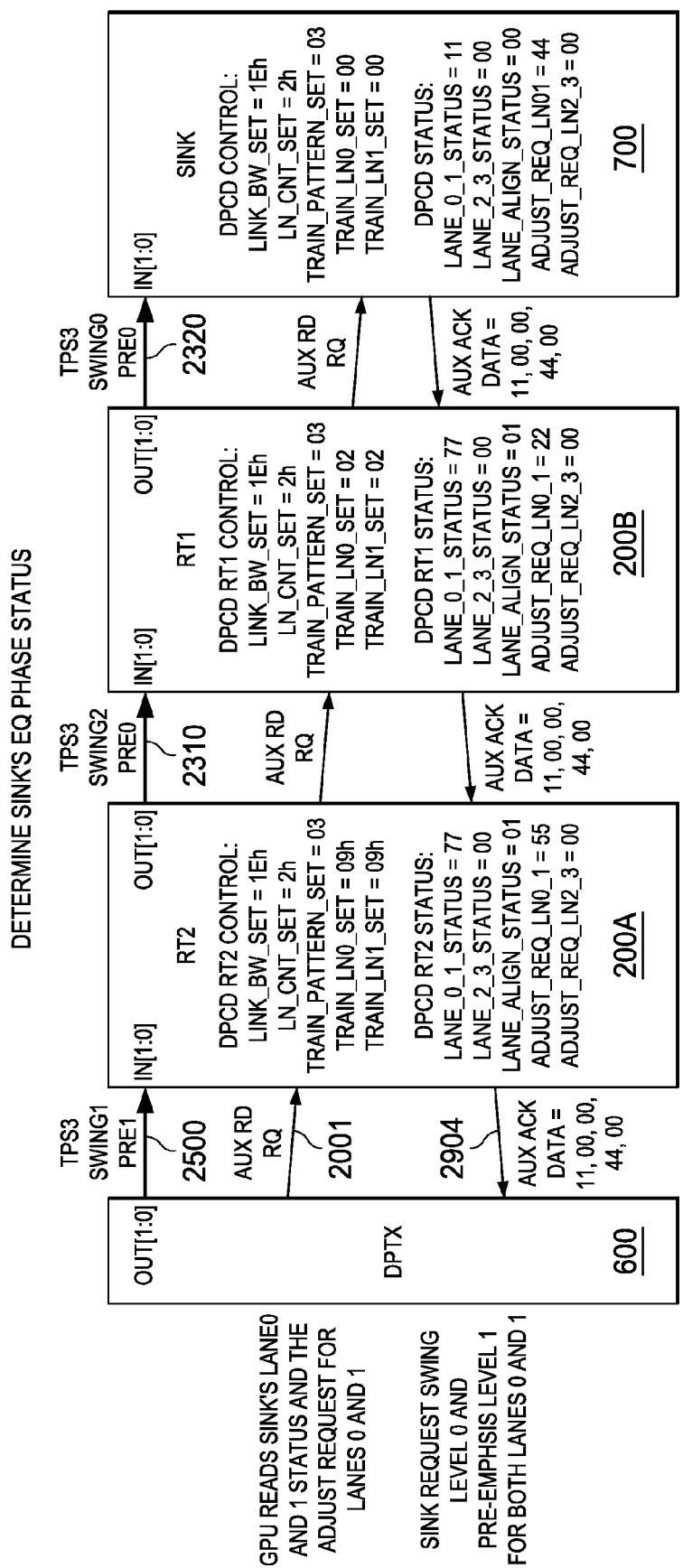

As shown in FIG. 29, source 600 may then read the sink 700 test results in response to training pattern 2320. The DisplayPort master node 600 performs an AUX_RD_RQ (read request) 2901 to sink 700 DPCD registers for LANE0 and LANE1 status to determine if an adjustment request has been generated by sink 700. The read request percolates through the chain as described in more detail above and is returned to source 600 as AUX-ACK 2904. In this example, a change in pre-emphasis is requested by sink 700.

Figure 30:
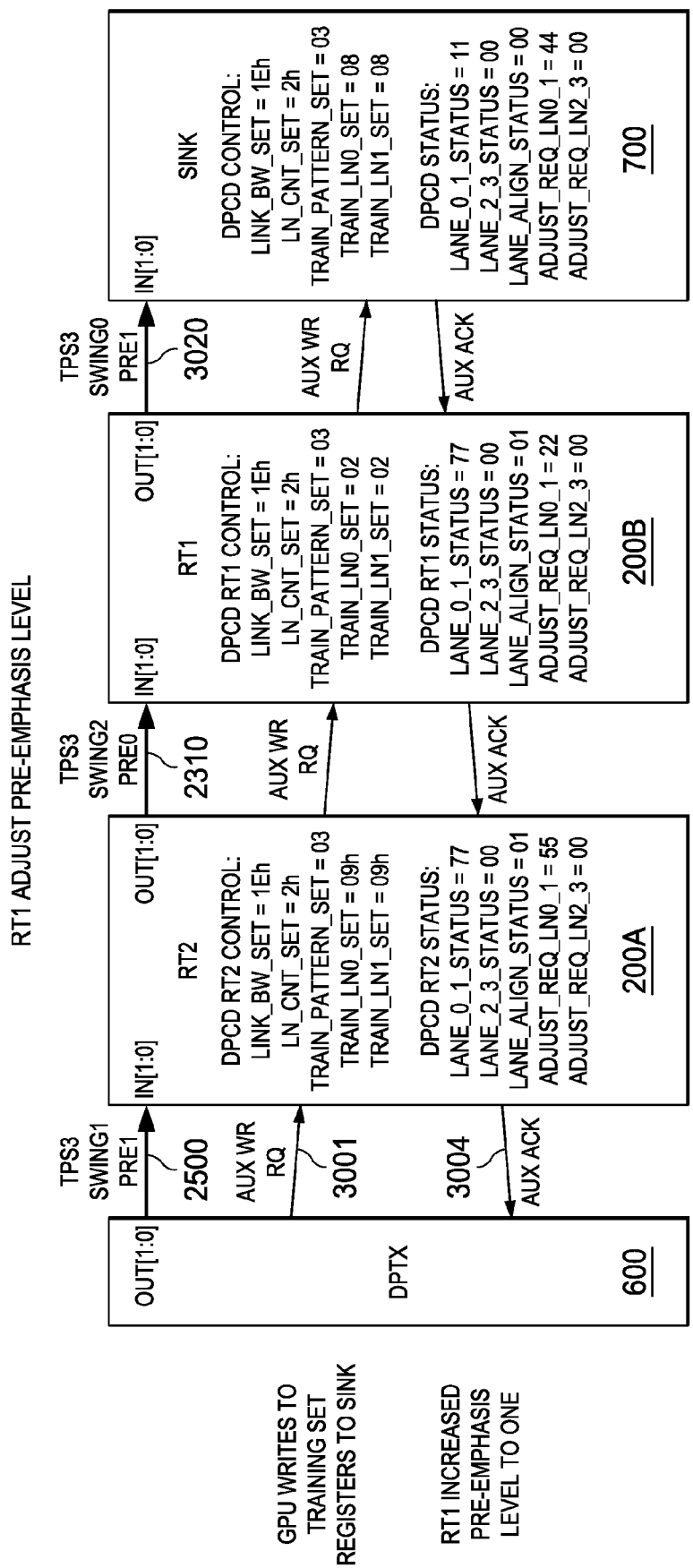

As shown in FIG. 30, an AUX write request 3001 is sent to the DPCD registers on sink 700 with the new parameters; which percolates through the chain and returns an AUX-ACK to source 3000 as described above. Retimer 200B snoops the AUX write request to sink 700 and changes the transmitter parameters on retimer 200B transmitters for lanes 0 and 1 to have a SWING of 0 and PRE_EMPHASIS of 1 and begins transmitting training pattern TPS3 3020 to sink 700 using the new parameters.

Figure 31:
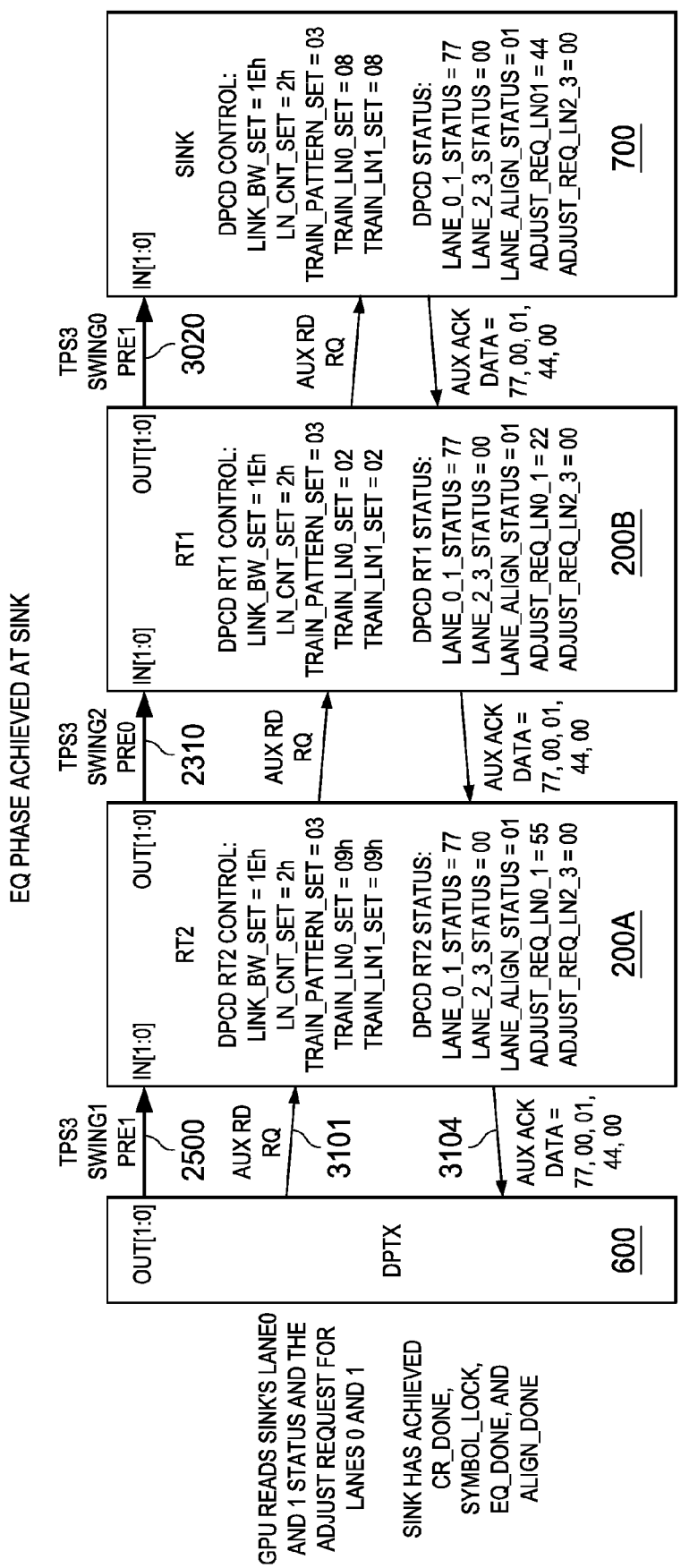

As shown in FIG. 31, source 600 may then again read the sink 700 test results in response to training pattern 3020. The DisplayPort master node 600 performs an AUX_RD_RQ (read request) 3101 to sink 700 registers for LANE0 and LANE1 status and for an adjustment request generated by sink 700. The read request percolates through the chain as described in more detail above and is returned to source 600 as AUX_ACK 3104. In this example, sink 700 has achieved symbol lock, equalization is done, and alignment is done so no additional changes are required for the transmitters in retimer 200B.

Figure 32:
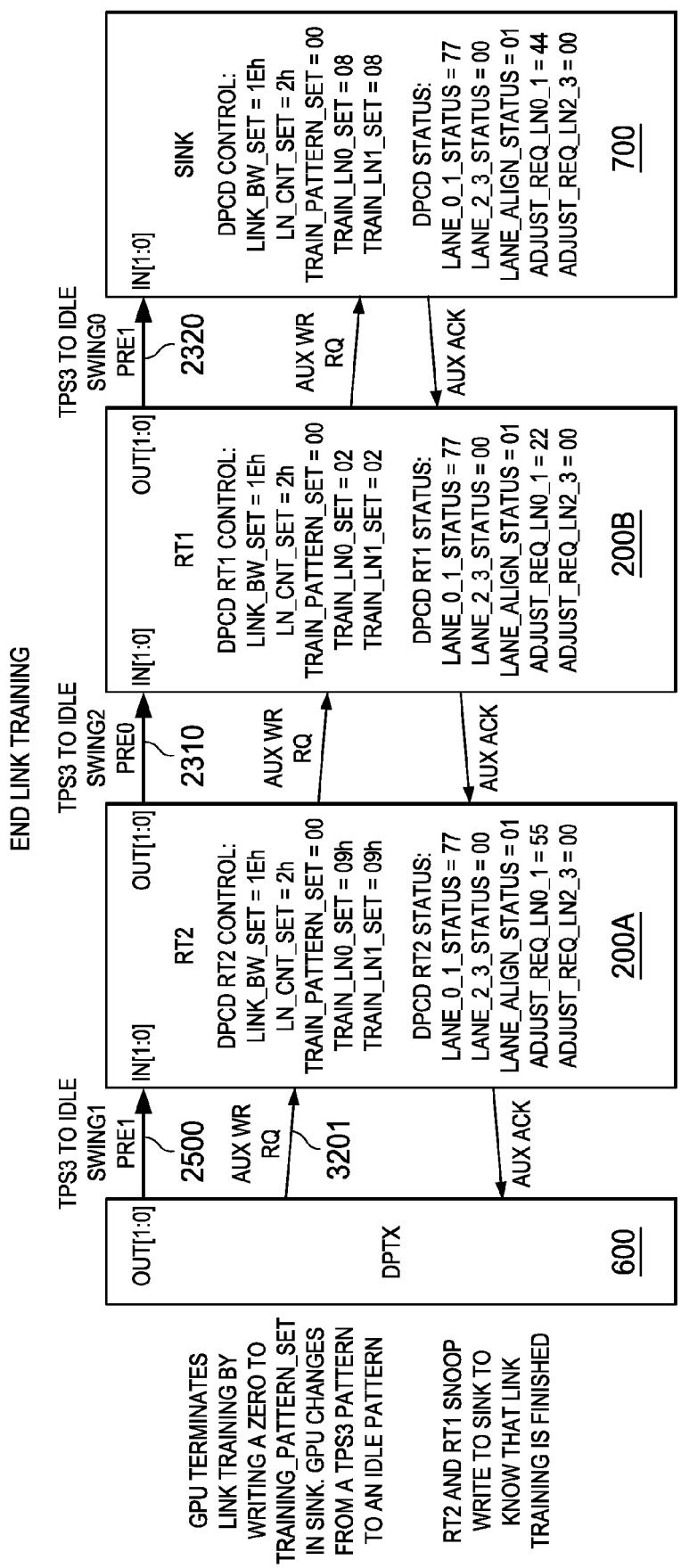

As shown in FIG. 32, the source 600 may now end link training by writing a 0 value to the TRAINING_PATTERN_SET (DPCD 00102h) of sink 700 via AUX_WR_RQ 3201. All the LT-tunable retimers continuously monitor writes to this register. Any time the TRAINING_PATTERN_SELECT fields within DPCD 00102h transition to a 0 value, the LT-tunable retimers know that link training is finished. The source 600 may then change the data pattern to an Idle Pattern.

Figure 33:
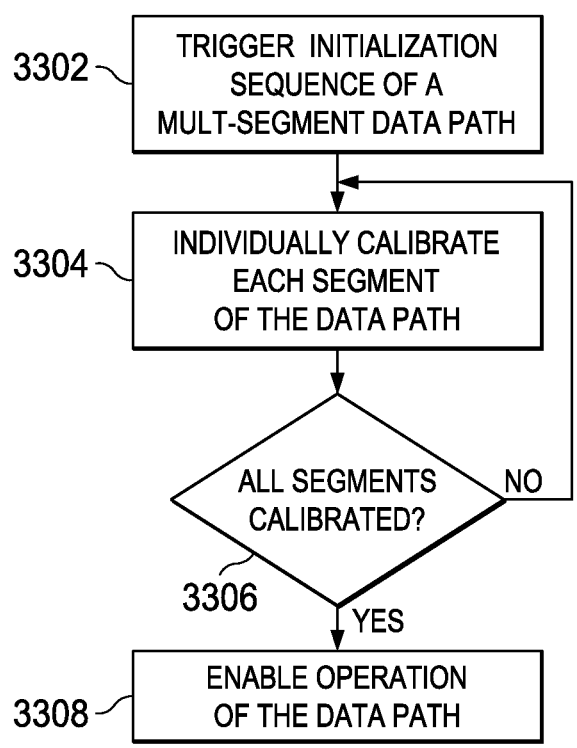
FIG. 33 is a logical flow diagram of one embodiment of a method for configuring a signal conditioning device.

FIG. 33 is a flow diagram of one embodiment for configuring a signal conditioning device. While the following discussion is presented in the context of DisplayPort, it is readily appreciated that the various principles described herein are widely applicable to bus technologies including without limitation Universal Serial Bus (USB), FireWire, and High Definition Multimedia Interface (HDMI).

A data path initialization sequence is triggered 3302 in response to an event such as detecting a hot-plug attachment of a device to a data path, or a power on event of a device coupled to the data path, for example.

In one embodiment, the data path is composed of one or more data path segments or hops, each data path segment characterized by at least two nodes. A node is a logical entity that independently generates/regenerates data path signaling. Common examples of a node include a data source, a data sink, a signal conditioning device, a bridge device, a repeater device, a master node, a slave node, and an intermediary node.

In one implementation, the data path is a unidirectional bus. In other implementations, the data path is a bi-directional bus. In still other implementations, the bus may be a hybrid bus incorporating both unidirectional and bi-directional capabilities.

In one implementation, a master node is set according to a fixed scheme. For example, in certain DisplayPort implementations (and HDMI networks), the source node is always the master node. In other implementations, a master node may be determined by virtue of the network topology, e.g., tree type hierarchies (such as used in USB) may implement a single master at the root of the tree. In still other implementations, the source node master node may be determined according to an arbitration scheme such as, for example, that used in FireWire.

In one implementation, the data path may be initialized 3302 on a power-up sequence. In other implementations, the data path is initialized 3302 based on a wake-up sequence. In still other implementations, the data path is initialized 3302 based on a hot-plug detect. Initialization may also be triggered based on, e.g., user input, or higher layer software applications.

For each data path segment, the master node calibrates 3304 the data path segment. In one implementation, the calibration sequence comprises iteratively setting one or more transmit parameters, receive parameters, and test sequences and determining the appropriate settings which provide optimal connectivity. Here, connectivity may be optimized according to various factors such as, for example, error rate, power consumption, link rate, link robustness, and emissions.

In another implementation, the calibration sequence may comprise setting default parameters for each data path segment, and only calibrating segments which are particularly problematic. For example, in certain variants, intermediary nodes may be able to collect or report back metrics which establish problematic connectivity, e.g., a running error rate.

Each data path may be individually addressed and configured. Alternatively, only portions of the data path may be individually addressed and configured. For example, the data path may incorporate some legacy components which cannot be addressed.

After the entire data path has been calibrated 3306, the data path is enabled 3308 for normal operation. In one exemplary embodiment, calibrated nodes may configure themselves for operation based on their corresponding parameters.

System Example

Figure 34:
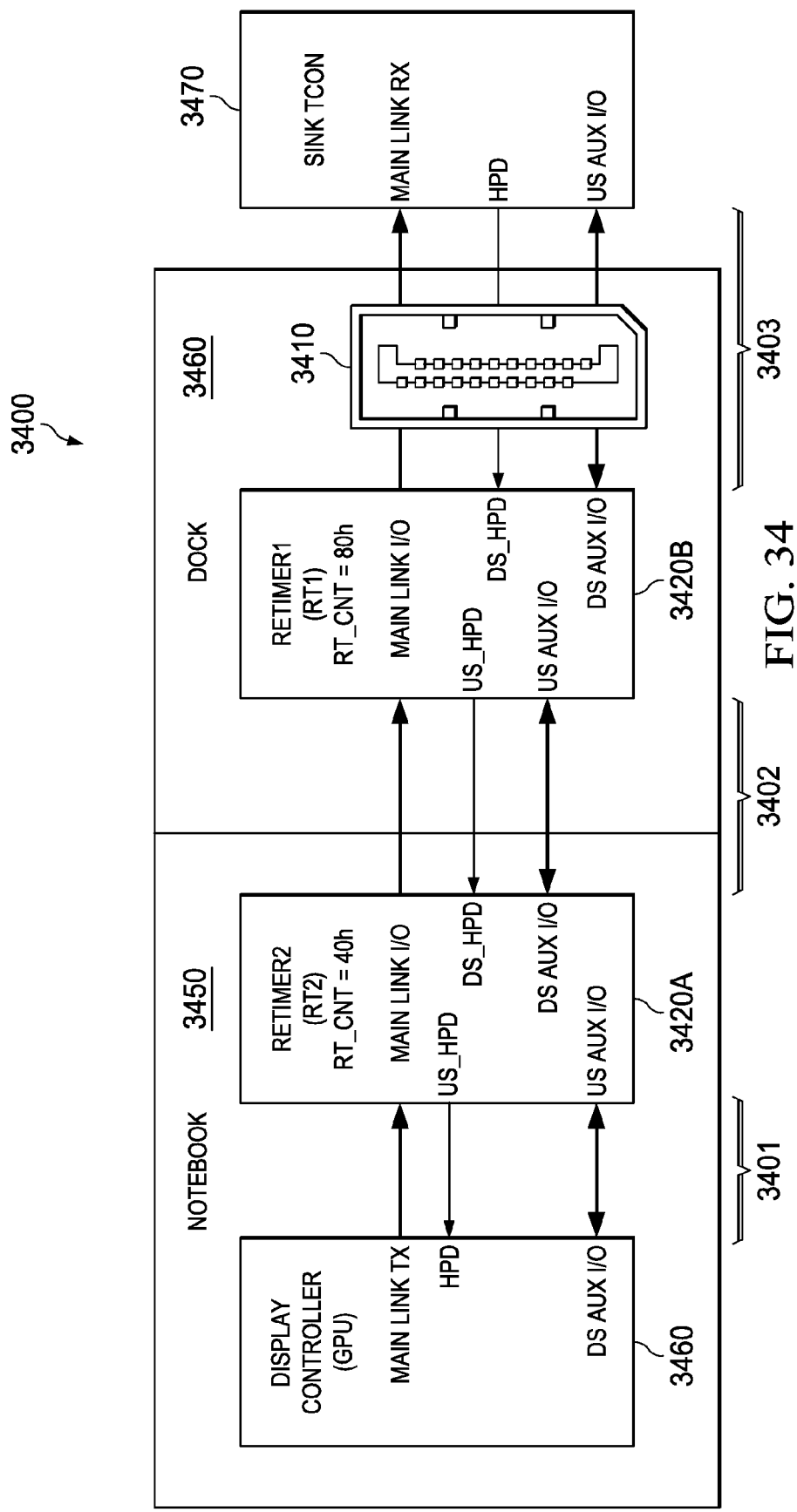
FIG. 34 is a block diagram of a system with an embodiment of the present disclosure.

FIG. 34 is a block diagram of a system with an embodiment of the present disclosure. This example is an illustration of an exemplary DisplayPort system 3400 that includes a source module 3460, a sink module 3470 and two LT-tunable retimer modules 3420A, 3420B. In this example, source module 3460 and retimer module 3420A are located in a common notebook computer enclosure 3450. The general construction and operation of notebook computers is well known and need not be described in further detail herein. In this example, module 3460 is the display controller for notebook computer 3450. As such, it generates the graphical/video data stream that produces images for display on monitor device 3470. The general operation of video controllers is well known and need not be described in further detail herein. Video controller 3460 includes the functionality of source module 600, as described above in more detail. Retimer module 3420A includes the retimer functionality of retimer module 200 described above in more detail.

Docking station 3460 includes retimer module 3420B and includes the retimer functionality of retimer module 200 described above in more detail. The general operation of docking stations is well known, and need not be described in further detail herein. In general, docking station 3460 may be coupled to a display device such as monitor 3470 via cable 3410, for example. Docking station 3460 may also be coupled to several other peripherals and devices using various cables, such as USB or Firewire, for example. Docking station 3460 provides a convenient mechanism to quickly attach notebook 3450 to the multiple peripheral devices without disturbing the various cables and connectors.

Monitor 3470 includes sink module 3470 that includes the functionality of sink node 700 as described in more detail above. The general operation of monitors is well known and need not be described in further detail herein. Sink module 3470 may be a legacy device that has no knowledge of link training tunable repeaters, as described herein, but still works probably with the link training techniques described herein.

In the example, there are three segments 3401, 3402, 3403 to the segmented data path from video controller 3460 to monitor 3470. Similar to the system described in FIG. 1, the Auxiliary Channel (AUX), the hot plug detect signal (HPD), and the DisplayPort main link lanes are routed serially through retimers 3420A, 3420B.

As described in more detail above, each segment may be individually trained by adjusting the transmitter parameters used in the transmitters located in each node 3460, 3420A an 3420B. Link trainable repeaters 3420A and 3420B operate smoothly with legacy sink devices, such as monitor 3470.

In another embodiment, retimer 3420B may be a legacy device that does not understand link training. In that case, retimer 3420A may be link trained as described above, while retimer 3420B remains transparent and is not trained.

Other Embodiments

While the disclosure has been described with reference to illustrative embodiments, this description is not intended to be construed in a limiting sense. Various other embodiments of the disclosure will be apparent to persons skilled in the art upon reference to this description. For example, while a DisplayPort system has been described herein, other embodiments may implement other types of multi-segment data paths such as, for example, Universal Serial Bus (USB), FireWire, High Definition Multimedia Interface (HDMI).

While a notebook computer and a docking station are described herein, embodiments of the present disclosure may be applied to all manner of systems in which a point to point segmented data path is useful such as, for example, PCs (personal computers), monitors, panels, projectors, mobile phones, tablets, and high definition (HD) content applications. Various embodiments may include internal chip-to-chip, and external "box-to-box" digital display connections. Examples of internal chip-to-chip applications include notebook PCs which drive a display panel from a graphics controller and display components from display controllers driving the monitor of a TV. Examples of box-to-box applications include display connections between PCs or tablets and monitors and projectors that are not housed within the same physical device.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the disclosure should not be considered limited to the specific ordering of steps shown in the figures and/or described herein.

It is therefore contemplated that the appended claims will cover any such modifications of the embodiments as fall within the true scope and spirit of the disclosure.

What is claimed is:

1. A method for configuring a segmented data path, the method comprising:
   triggering an initialization sequence of the segmented data path, in which the data path includes a source node coupled to a sink node with one or more intermediate nodes, in which the source node is coupled a first intermediate node by a first data path segment and the sink node is coupled to a last intermediate node by a second data path segment;
   calibrating the first data path segment by:
      sending a first training data sequence from a transmitter on the source node via a data lane of the first data path segment;
      performing a first training phase on the first intermediate node in response to the first training data sequence;
      sending a first read request from the source node via a control path of the segmented data path to a reserved address on the sink node;
      receiving a first reply to the first read request with a parameter change request responsive to the first training phase from a first status register on the first intermediate node, in which the sink node provides a null response that is received by the first intermediate node that is then replaced with the change request from the first intermediate node; and
      adjusting transmit parameters for the transmitter on the source node in response to the change request from the first intermediate node; and
   calibrating the second path segment by:
      forwarding the first training data sequence by a transmitter on the last intermediate node to the sink node via a data lane of the second data path segment;
      performing a second training phase on the sink node in response to the first training data sequence;
      sending a second read request from the source node via the control path to an address of a status register on the sink node;

receiving a second reply to the second read request with a parameter change request responsive to the second training phase from the status register on the sink node, in which the sink node provides a response that is then received and forwarded to the source node by the last intermediate node; and adjusting transmit parameters of the transmitter on the last intermediate node in response to the change request from the sink node.

2. The method of claim 1, in which the segmented data path includes at least a third path segment coupled between the first intermediate node and a second intermediate node, in which the third path segment is calibrated by:

forwarding the first training data sequence using a transmitter on the first intermediate node to the second intermediate node via a data lane of the third data path segment;

performing a third training phase on the second intermediate node in response to the first training data sequence;

sending a third read request from the source node via the control path to a reserved address on the sink node;

receiving a third reply to the third read request with a parameter change request responsive to the third training phase from a status register on the second intermediate node, in which the sink node provides a null response that is then received and forwarded to the source node by the first intermediate node; and adjusting transmit parameters for the transmitter on the first intermediate node in response to the change request from the second intermediate node.

3. The method of claim 1, in which the first intermediate node and the last intermediate node are a same node.

4. The method of claim 1, in which the source node determines the presence of the one or more intermediate nodes by:

sending a read request via the control path to a reserved address on the sink node;

receiving a reply to the read request with an intermediate node count value, in which the sink node provides a null response that is received sequentially by each of the one or more intermediate nodes, in which each of the one or more intermediate nodes increases a count value received from a down-stream one of the intermediate nodes.

5. The method of claim 4, in which each intermediate node selects an address range to use for responding to read requests by noting the node count value received from an adjacent down-stream intermediate node.

6. The method of claim 1, in which the method is repeated for a second training phase of the first segment and the second segment by sending a second training data sequence from the source node.

7. The method of claim 1, in which:

the steps of calibrating the first data path segment are repeated until receiving a reply to a read request from the source node that indicates the first training phase for the first data path segment is complete; and the steps of calibrating the second data path segment are repeated until receiving a reply to a read request from the source node that indicates the first training phase for the second data path segment is complete.

8. The method of claim 1, in which triggering the initialization sequence is in response to detecting a hot-plug event.

9. A system comprising:

a signal conditioning node having an input port for coupling to a source node via a first data path segment and an output port for coupling to downstream node via a second data path segment, wherein the signal conditioning node comprises:

a transmitter coupled to drive the output port; and circuitry coupled to the input port and configured to:

perform a training phase in response to a training sequence received on the input port;

reply to a training read request sent by the source node to the downstream node by ignoring a downstream reply from the downstream node and substituting a training reply different from the downstream reply when the read request is addressed to a first set of addresses;

reply to the training read request by forwarding a training reply from the downstream node when the training packet is addressed to a second set of addresses; and calibrate the transmitter in response to the training reply from the downstream node.

10. The system of claim 9, in which the circuitry is further configured to receive a reply from a down-stream node to a read request from an upstream node that contains a count value and to increment the count value and send the incremented count value to an up-stream node.

11. The system of claim 10, in which the signal conditioning node includes circuitry configured to select an address range for status and control registers according to the count value received from a down-stream node.

12. A system comprising:

a source node having a transmitter coupled to drive an output configured to couple to a first data path segment of a segmented data path, in which the data path includes one or more intermediate nodes, in which the source node is coupled a first intermediate node by a first data path segment and a sink node is coupled to a last intermediate node by a second data path segment, in which the source node is operable to:

calibrate the first path segment by:

sending a first training data sequence from the source node via a data lane of the first data path segment for use by the first intermediated node to perform a first training phase;

sending a first read request from the source node via a control path of the segmented data path to a reserved address on the sink node;

receiving a first reply to the first read request with a parameter change request responsive to the first training phase from a first status register on the first intermediate node, in which the sink node provides a null response that is received by the first intermediate node that is then replaced with the change request from the first intermediate node; and adjusting transmit parameters of the transmitter on the source node in response to the change request from the first intermediate node; and calibrate the second path segment by:

continuing to send the first training sequence that is forwarded from the last intermediate node to the sink node via a data lane of the second data path segment for use by the sink node to perform a second training phase;

sending a second read request from the source node via the control path to an address of a status register on the sink node; and receiving a second reply to the second read request with a parameter change request responsive to the second training phase from the status register on the sink node, in which the sink node provides a response that is then received and forwarded to the source node by the last intermediate node, in which the last intermediate node adjusts its transmit parameters in response to the change request from the sink node.

13. The system of claim 12, in which each intermediate node has an input port for coupling to an upstream node via an upstream data path segment and an output port for coupling to a downstream node via a downstream data path segment, in which each intermediate node comprises:
a transmitter coupled to drive the output port;
training logic coupled to the input port to perform a training phase in response to a training sequence received on the input port;
read request logic coupled to the input port to reply to a training read request sent by the source node to the sink node by ignoring a reply from the sink node and substituting a training reply from the training logic when the read request is addressed to a first set of addresses; and
logic coupled to the read request logic to reply to the training read request by forwarding a training reply from the downstream node when the training packet is addressed to a second set of addresses; and
logic to calibrate the transmitter in response to the training reply from the downstream node.

14. The intermediate node of claim 13, in which the intermediate node includes detection logic operable to receive a reply from a down-stream node to a read request from an upstream node that contains a count value and to increment the count value and send the incremented count value to an up-stream node.

15. The intermediate node of claim 14, in which the intermediate node includes status and control registers with address logic that is operable to select an address range for the status and control registers according to the count value received from a down-stream node.

16. A method for configuring one or more signal conditioning devices, comprising:
triggering, with a master node device, an initialization sequence of a data path, in which the data path has a plurality of data path segments serially coupled between a plurality of nodes, the plurality of nodes including first, second, and third nodes, the plurality of data path segments including a first data path segment coupled between the first and second nodes, and a second data path segment coupled between the second and third nodes;
calibrating, for each data path segment and associated receiving node and with the master node device, the data path segment using a training sequence transmitted by a transmitter in an adjacent upstream node by adjusting transmission parameters of the upstream transmitter in response to change requests provided by the receiving node; and
enabling, with the master node device, the data path when the plurality of data path segments have been individually calibrated.

17. The method of claim 16, in which calibration of each data path segment is controlled by sending read requests from a source node on the data path to a last node on the data path in which the read requests are to addresses that are in a range that causes the last node to provide a negative acknowledgement to the read requests while an intermediate node modifies the negative acknowledgment to provide a positive acknowledgement to the read request from the source node.

18. The method of claim 17, in which each intermediate node selects an address range to use for responding to read requests by noting the node count value received from an adjacent down-stream intermediate node.

19. The method of claim 16, in which calibrating each data path segment is repeated until receiving a reply to a read request that indicates a training phase for the data path segment is complete.

20. The method of claim 16, in which triggering the initialization sequence is in response to detecting a hot-plug event.

* * * * *